US 6,721,806 B2

(12) United States Patent
Boyd et al.

(10) Patent No.: US 6,721,806 B2
(45) Date of Patent: Apr. 13, 2004

(54) REMOTE DIRECT MEMORY ACCESS ENABLED NETWORK INTERFACE CONTROLLER SWITCHOVER AND SWITCHBACK SUPPORT

(75) Inventors: William Todd Boyd, Poughkeepsie, NY (US); Douglas J. Joseph, Danbury, CT (US); Michael Anthony Ko, San Jose, CA (US); Renato John Recio, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 19 days.

(21) Appl. No.: 10/235,691

(22) Filed: Sep. 5, 2002

(65) Prior Publication Data

US 2004/0049774 A1 Mar. 11, 2004

(51) Int. Cl.[7] .............................................. G06F 13/00
(52) U.S. Cl. ..................................................... 709/312
(58) Field of Search ................................ 709/200, 105, 709/235, 321, 212, 213, 214, 215, 216, 310, 312, 250; 714/100, 1, 2, 4, 5, 6, 9

(56) References Cited

U.S. PATENT DOCUMENTS

| 5,295,258 | A |   | 3/1994  | Jewett et al. ............... 395/575    |
| 5,774,640 | A |   | 6/1998  | Kurio ...................... 395/182.02  |
| 6,052,733 | A |   | 4/2000  | Mahalingam et al. ........ 709/235       |
| 6,105,151 | A |   | 8/2000  | Mahalingam et al. ......... 714/48       |
| 6,134,678 | A |   | 10/2000 | Mahalingam et al. ......... 714/48       |
| 6,253,334 | B1 |   | 6/2001 | Amdahl et al. ................ 714/4     |
| 6,311,288 | B1 |   | 10/2001 | Heeren et al. ................. 714/4   |
| 6,314,525 | B1 |   | 11/2001 | Mahalingham et al. ........ 714/4       |
| 6,490,632 | B1 | * | 12/2002 | Vepa et al. ................. 709/250    |

* cited by examiner

*Primary Examiner*—Robert B. Harrell
(74) *Attorney, Agent, or Firm*—Duke W. Yee; Casimer K. Salys; Stephen J. Walder, Jr.

(57) ABSTRACT

A method, computer program product, and distributed data processing system for supporting RNIC (RDMA enabled NIC) switchover and switchback are provided. Using the mechanism provided in the present invention when a planned or unplanned outage occurs on a primary RNIC, all outstanding connections are switched over to an alternate RNIC, and the alternate RNIC continues communication processing. Additionally, using the mechanism provided in the present invention, connections can also be switched back.

27 Claims, 16 Drawing Sheets

REMOTE DIRECT MEMORY ACCESS ENABLED NETWORK INTERFACE CONTROLLER SWITCHOVER AND SWITCHBACK SUPPORT

BACKGROUND OF THE INVENTION

1. Technical Field:

The present invention generally relates to communication protocols between a host computer and an input/output (I/O) device. More specifically, the present invention provides a method by which a Remote Direct Memory Access (RDMA) enabled Network Interface Controller (NIC) can support a redundant configuration consisting of a primary and an alternate RDMA enabled NIC (RNIC).

2. Description of Related Art:

In an Internet Protocol (IP) Network, the software provides a message passing mechanism that can be used to communicate with Input/Output devices, general purpose computers (host), and special purpose computers. The message passing mechanism consists of a transport protocol, an upper level protocol, and an application programming interface. The key standard transport protocols used on IP networks today are the Transmission Control Protocol (TCP) and the User Datagram Protocol (UDP). TCP provides a reliable service and UDP provides an unreliable service. In the future the Stream Control Transmission Protocol (SCTP) will also be used to provide a reliable service. Processes executing on devices or computers access the IP network through Upper Level Protocols, such as Sockets, iSCSI, and Direct Access File System (DAFS).

Unfortunately the TCP/IP software consumes a considerable amount of processor and memory resources. This problem has been covered extensively in the literature (see J. Kay, J. Pasquale, "Profiling and reducing processing overheads in TCP/IP", IEEE/ACM Transactions on Networking, Vol 4, No. 6, pp. 817–828, December 1996; and D. D. Clark, V. Jacobson, J. Romkey, H. Salwen, "An analysis of TCP processing overhead", IEEE Communications Magazine, volume: 27, Issue: 6, June 1989, pp 23–29). In the future the network stack will continue to consume excessive resources for several reasons, including: increased use of networking by applications; use of network security protocols; and the underlying fabric bandwidths are increasing at a higher rate than microprocessor and memory bandwidths. To address this problem the industry is offloading the network stack processing to an RDMA enabled NIC (RNIC).

There are two offload approaches being taken in the industry. The first approach uses the existing TCP/IP network stack, without adding any additional protocols. This approach can offload TCP/IP to hardware, but unfortunately does not remove the need for receive side copies. As noted in the papers above, copies are one of the largest contributors to CPU utilization. To remove the need for copies, the industry is pursuing the second approach that consists of adding Framing, Direct Data Placement (DDP), and Remote Direct Memory Access (RDMA) over the TCP and SCTP protocols. The RDMA enabled NIC (RNIC) required to support these two approaches is similar, the key difference being that in the second approach the hardware must support the additional protocols.

The RNIC provides a message passing mechanism that can be used by sockets, iSCSI, and DAFS to communicate between nodes. Processes executing on host computers, or devices, access the IP network by posting send/receive messages to send/receive work queues on an RNIC. These processes also are referred to as "consumers".

The send/receive work queues (WQ) are assigned to a consumer as a queue pair (QP). The messages can be sent over several different transport types: traditional TCP, RDMA TCP, UDP, or SCTP. Consumers retrieve the results of these messages from a completion queue (CQ) through RNIC send and receive work completion (WC) queues. The source RNIC takes care of segmenting outbound messages and sending them to the destination. The destination RNIC takes care of reassembling inbound messages and placing them in the memory space designated by the destination's consumer. These consumers use RNIC verbs to access the functions supported by the RNIC. The software that interprets verbs and directly accesses the RNIC is known as the RNIC Interface (RI).

Today, software in the host CPU performs most of the transport (e.g., TCP) and network layer (e.g., IP) processing. Today, the NIC typically performs the link layer (e.g., Ethernet) processing and possibly a modest amount of transport or network layer offload (e.g., Checksum offload). Today, the host software maintains all the state information associated with TCP/IP connections in host local memory. Keeping all the state information in host local memory allows the host software to support switchover, and switchback, between a primary NIC and an alternate NIC. That is, if the primary NIC fails, the host software moves all the connections to the alternate NIC and continues communication processing.

RDMA enabled NICs offer a higher performance interface for communicating to other general purpose computers and I/O devices. RNICs offload the transport (e.g., TCP) and network (e.g., IP) layer into the RNIC. By migrating these layers into the RNIC, the host software is no longer able to support switchover and switchback using today's mechanisms. Therefore, a simple mechanism is needed to allow RNICs to support switchover and switchback of reliable transport (e.g. TCP) connections and allow communications to continue as a result of a planned or unplanned RNIC outage.

SUMMARY OF THE INVENTION

The present invention provides a method, computer program product, and distributed data processing system for supporting RNIC switchover and switchback. The distributed data processing system comprises end nodes, switches, routers, and links interconnecting the components. The end nodes use send and receive queue pairs to transmit and receive messages. The end nodes segment the message into segments and transmit the segments over the links. The switches and routers interconnect the end nodes and route the segments to the appropriate end nodes. The end nodes reassemble the segments into a message at the destination.

The present invention provides a mechanism for supporting RNIC (RDMA enabled NIC) switchover and switchback. Using the mechanism provided in the present invention when a planned or unplanned outage occurs on a primary RNIC, all outstanding connections are switched over to an alternate RNIC, and the alternate RNIC continues communication processing. Additionally, using the mechanism provided in the present invention, connections can also be switched back.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

The present invention provides a distributed computing system having endnodes, switches, routers, and links interconnecting these components. The endnodes can be Internet Protocol Suite Offload Engines or traditional host software based Internet protocol suites. Each endnode uses send and receive queue pairs to transmit and receive messages. The endnodes segment the message into frames and transmit the frames over the links. The switches and routers interconnect the endnodes and route the frames to the appropriate endnode. The endnodes reassemble the frames into a message at the destination.

Figure 1:
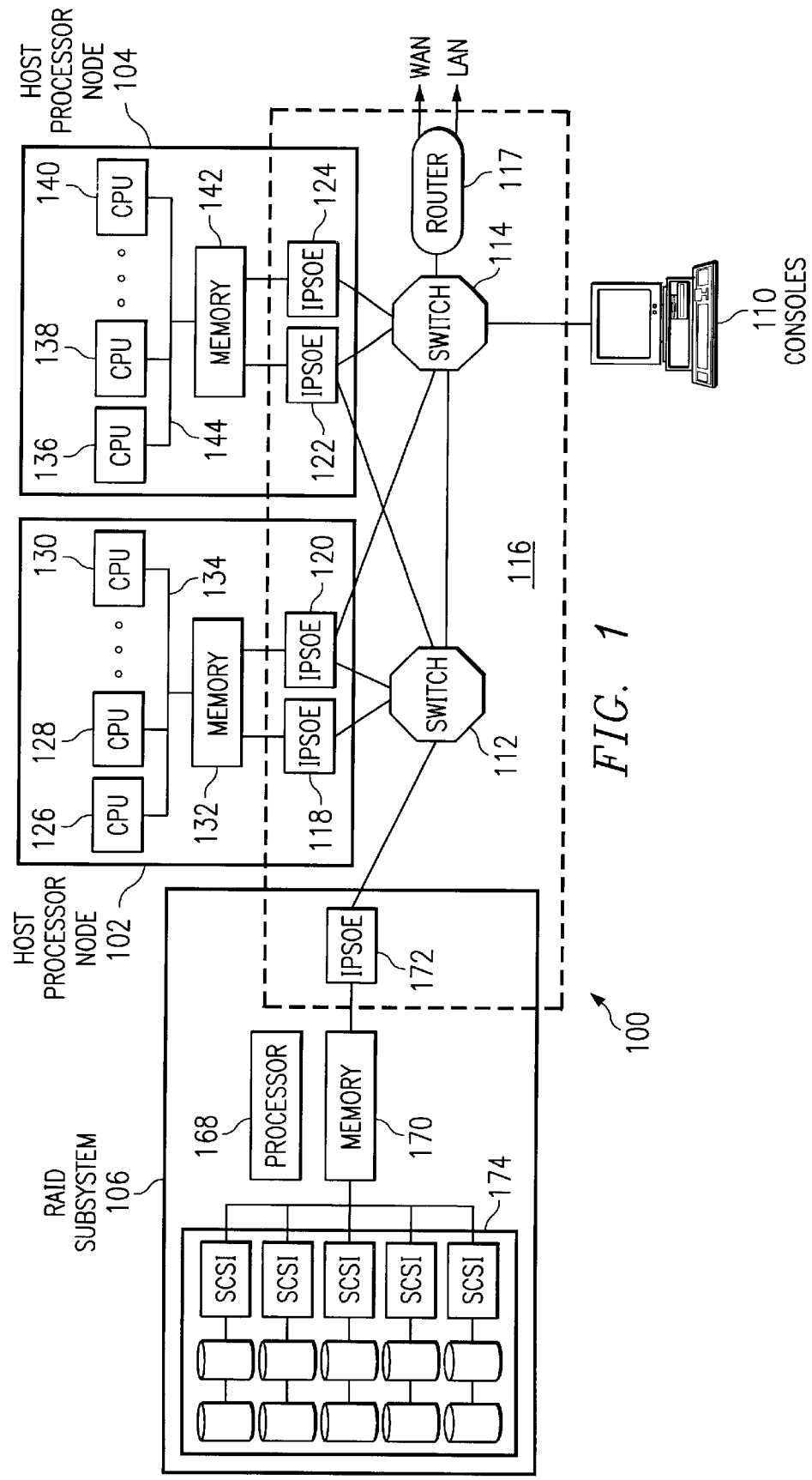
FIG. 1 is a diagram of a distributed computer system illustrated in accordance with a preferred embodiment of the present invention.

With reference now to the figures and in particular with reference to FIG. 1, a diagram of a distributed computer system is illustrated in accordance with a preferred embodiment of the present invention. The distributed computer system represented in FIG. 1 takes the form of an Internet protocol network (IP net), such as IP net 100, and is provided merely for illustrative purposes, and the embodiments of the present invention described below can be implemented on computer systems of numerous other types and configurations. For example, computer systems implementing the present invention can range from a small server with one processor and a few input/output (I/O) adapters to massively parallel supercomputer systems with hundreds or thousands of processors and thousands of I/O adapters. Furthermore, the present invention can be implemented in an infrastructure of remote computer systems connected by an Internet or intranet. IP net 100 is a high-bandwidth, low-latency network interconnecting nodes within the distributed computer system. A node is any component attached to one or more links of a network and forming the origin and/or destination of messages within the network. In the depicted example, IP net 100 includes nodes in the form of host processor node 102, host processor node 104, and redundant array independent disk (RAID) subsystem node 106. The nodes illustrated in FIG. 1 are for illustrative purposes only, as IP net 100 can connect any number and any type of independent processor nodes, storage nodes, and special purpose processing nodes. Any one of the nodes can function as an endnode, which is herein defined to be a device that originates or finally consumes messages or frames in IP net 100.

In one embodiment of the present invention, an error handling mechanism in distributed computer systems is present in which the error handling mechanism allows for TCP or SCTP communication between endnodes in a distributed computing system, such as IP net 100.

A message, as used herein, is an application-defined unit of data exchange, which is a primitive unit of communication between cooperating processes. A frame is one unit of data encapsulated by Internet Protocol Suite headers and/or trailers. The headers generally provide control and routing information for directing the frame through IP net 100. The trailer generally contains control and cyclic redundancy check (CRC) data for ensuring frames are not delivered with corrupted contents.

Within a distributed computer system, IP net 100 contains the communications and management infrastructure supporting various forms of traffic, such as storage, interprocess communications (IPC), file access, and sockets. IP net 100 shown in FIG. 1 includes a switched communications fabric 116, which allows many devices to concurrently transfer data with high-bandwidth and low-latency in a secure, remotely managed environment. Endnodes can communicate over multiple ports and can utilize multiple paths through the IP net fabric. The multiple ports and paths through the IP net shown in FIG. 1 can be employed for fault tolerance and increased bandwidth data transfers. Access to components in switched communications fabric 116, for administration and maintenance, may occur through consoles 110.

The IP net 100 in FIG. 1 includes switch 112, switch 114, and router 117. A switch is a device that connects multiple links together and allows routing of frames from one link to another link using the layer 2 destination address field. When the Ethernet is used as the link, the destination field is known as the media access control (MAC) address. A router is a device that routes frames based on the layer 3 destination address field. When Internet Protocol (IP) is used as the layer 3 protocol, the destination address field is an IP address.

In one embodiment, a link is a full duplex channel between any two network fabric elements, such as endnodes, switches, or routers. Example suitable links include, but are not limited to, copper cables, optical cables, and printed circuit copper traces on backplanes and printed circuit boards.

For reliable service types (TCP and SCTP), endnodes, such as host processor endnodes and I/O adapter endnodes, generate request frames and return acknowledgment frames. Switches and routers pass frames along, from the source to the destination.

In IP net 100 as illustrated in FIG. 1, host processor node 102, host processor node 104, and RAID subsystem node 106 include at least one IPSOE to interface to IP net 100. In one embodiment, each IPSOE is an endpoint that implements the IPSOI in sufficient detail to source or sync frames transmitted on IP net 100. Host processor node 102 contains IPSOEs in the form of host IPSOE 118 and IPSOE 120. Host processor node 104 contains IPSOE 122 and IPSOE 124. Host processor node 102 also includes central processing units 126–130 and a memory 132 interconnected by bus system 134. Host processor node 104 similarly includes central processing units 136–140 and a memory 142 interconnected by a bus system 144.

IPSOE 118 provides a connection to switch 112, while IPSOE 124 provides a connection to switch 114, and IPSOEs 120 and 122 provide a connection to switches 112 and 114.

In one embodiment, an IP Suite Offload Engine is implemented in hardware or a combination of hardware and offload microprocessor(s). In this implementation, IP suite processing is offloaded to the IPSOE. This implementation also permits multiple concurrent communications over a switched network without the traditional overhead associated with communicating protocols. In one embodiment, the IPSOEs and IP net 100 in FIG. 1 provide the consumers of the distributed computer system with zero processor-copy data transfers without involving the operating system kernel process, and employs hardware to provide reliable, fault tolerant communications.

As indicated in FIG. 1, router 117 is coupled to wide area network (WAN) and/or local area network (LAN) connections to other hosts or other routers. In this example, RAID subsystem node 106 in FIG. 1 includes processor 168, memory 170, IP Suite Offload Engine (IPSOE) 172, and multiple redundant and/or striped storage disk unit 174.

IP net 100 handles data communications for storage, interprocessor communications, file accesses, and sockets. IP net 100 supports high-bandwidth, scalable, and extremely low-latency communications. User clients can bypass the operating system kernel process and directly access network communication components, such as IPSOEs, which enable efficient message passing protocols. IP net 100 is suited to current computing models and is a building block for new forms of storage, cluster, and general networking communication. Further, IP net 100 in FIG. 1 allows storage nodes to communicate among themselves or to communicate with any or all of the processor nodes in a distributed computer system. With storage attached to IP net 100, the storage node has substantially the same communication capability as any host processor node in IP net 100.

In one embodiment, the IP net 100 shown in FIG. 1 supports channel semantics and memory semantics. Channel semantics is sometimes referred to as send/receive or push communication operations. Channel semantics are the type of communications employed in a traditional I/O channel where a source device pushes data and a destination device determines a final destination of the data. In channel semantics, the frame transmitted from a source process specifies a destination processes communication port, but does not specify where in the destination processes' memory space the frame will be written. Thus, in channel semantics, the destination process pre-allocates where to place the transmitted data.

In memory semantics, a source process directly reads or writes the virtual address space of a remote node destination process. The remote destination process need only communicate the location of a buffer for data, and does not need to be involved in the transfer of any data. Thus, in memory semantics, a source process sends a data frame containing the destination buffer memory address of the destination process. In memory semantics, the destination process previously grants permission for the source process to access its memory.

Channel semantics and memory semantics are typically both necessary for storage, cluster, and general networking communications. A typical storage operation employs a combination of channel and memory semantics. In an illustrative example storage operation of the distributed computer system shown in FIG. 1, a host processor node, such as host processor node 102, initiates a storage operation by using channel semantics to send a disk write command to the RAID subsystem IPSOE 172. The RAID subsystem examines the command and uses memory semantics to read the data buffer directly from the memory space of the host processor node. After the data buffer is read, the RAID subsystem employs channel semantics to push an I/O completion message back to the host processor node.

In one exemplary embodiment, the distributed computer system shown in FIG. 1 performs operations that employ virtual addresses and virtual memory protection mechanisms to ensure correct and proper access to all memory. Applications running in such a distributed computer system are not required to use physical addressing for any operations.

Figure 2:
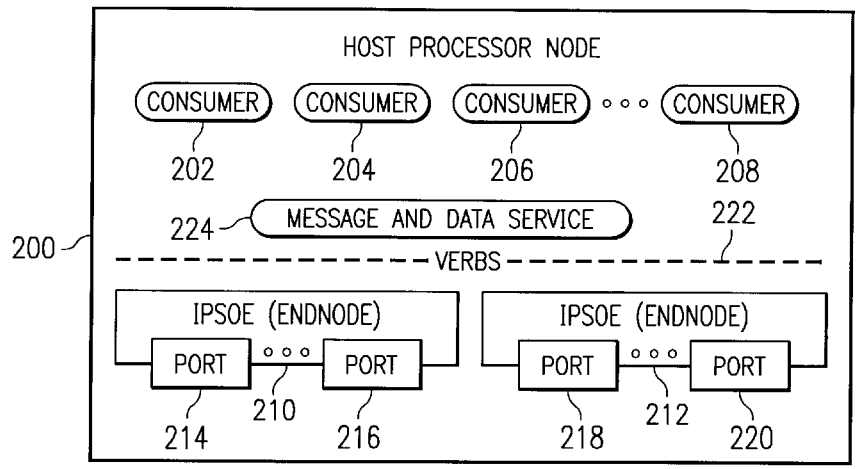
FIG. 2 is a functional block diagram of a host processor node in accordance with a preferred embodiment of the present invention.

Turning next to FIG. 2, a functional block diagram of a host processor node is depicted in accordance with a preferred embodiment of the present invention. Host processor node 200 is an example of a host processor node, such as host processor node 102 in FIG. 1. In this example, host processor node 200, shown in FIG. 2, includes a set of consumers 202–208, which are processes executing on host processor node 200. Host processor node 200 also includes IP Suite Offload Engine (IPSOE) 210 and IPSOE 212. IPSOE 210 contains ports 214 and 216 while IPSOE 212 contains ports 218 and 220. Each port connects to a link. The ports can connect to one IP net subnet or multiple IP net subnets, such as IP net 100 in FIG. 1.

Consumers 202–208 transfer messages to the IP net via the verbs interface 222 and message and data service 224. A verbs interface is essentially an abstract description of the functionality of an IP Suite Offload Engine. An operating system may expose some or all of the verb functionality through its programming interface. Basically, this interface defines the behavior of the host. Additionally, host processor node 200 includes a message and data service 224, which is a higher-level interface than the verb layer and is used to process messages and data received through IPSOE 210 and IPSOE 212. Message and data service 224 provides an interface to consumers 202–208 to process messages and other data.

Figure 3A:
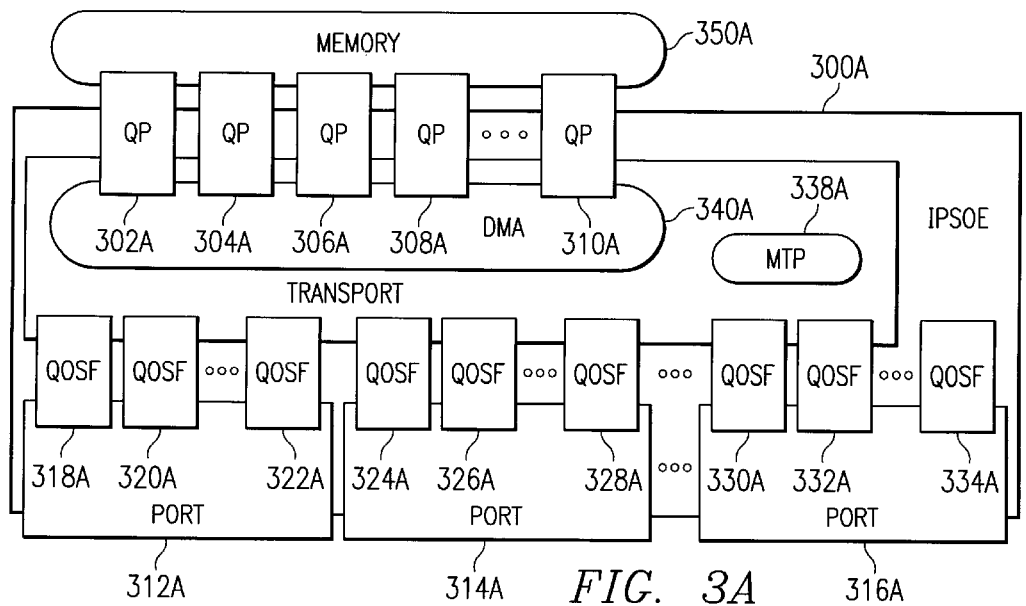
FIG. 3A is a diagram of an IP Suite Offload Engine in accordance with a preferred embodiment of the present invention.

With reference now to FIG. 3A, a diagram of an IP Suite Offload Engine is depicted in accordance with a preferred embodiment of the present invention. IP Suite Offload Engine 300A shown in FIG. 3A includes a set of queue pairs (QPs) 302A–310A, which are used to transfer messages to the IPSOE ports 312A–316A. Buffering of data to IPSOE ports 312A–316A is channeled using the network layer's quality of service field (QOSF), for example, the Traffic Class field in the IP Version 6 specification, 318A–334A. Each network layer quality of service field has its own flow control. Internet Engineering Task Force (IETF) standard network protocols are used to configure the link and network addresses of all IP Suite Offload Engine ports connected to the network. Two such protocols are Address Resolution Protocol (ARP) and Dynamic Host Configuration Protocol. Memory translation and protection (MTP) 338A is a mechanism that translates virtual addresses to physical addresses and validates access rights. Direct memory access (DMA) 340A provides for direct memory access operations using memory 350A with respect to queue pairs 302A–310A.

A single IP Suite Offload Engine, such as IPSOE 300A shown in FIG. 3A, can support thousands of queue pairs. Each queue pair consists of a send work queue (SWQ) and a receive work queue (RWQ). The send work queue is used to send channel and memory semantic messages. The receive work queue receives channel semantic messages. A consumer calls an operating system specific programming interface, which is herein referred to as "verbs", to place work requests (WRs) onto a work queue.

Figure 3B:
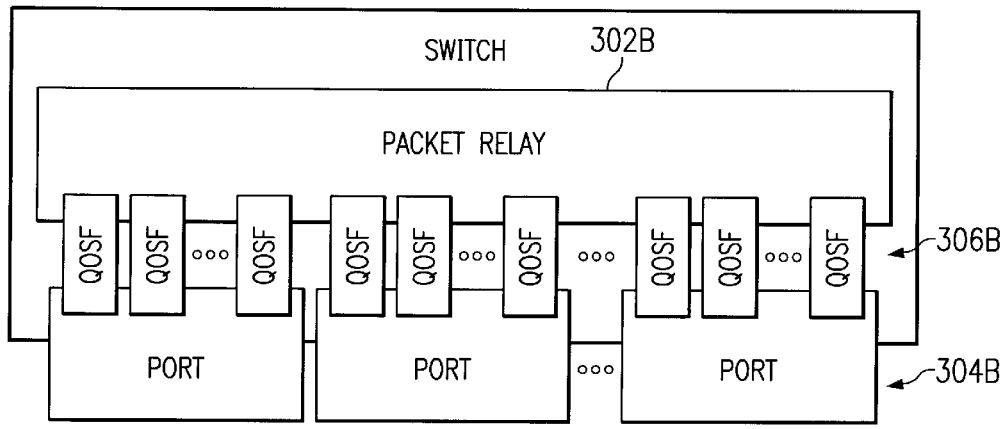
FIG. 3B is a diagram of a switch in accordance with a preferred embodiment of the present invention.

FIG. 3B depicts a switch, such as switch 300B, in accordance with a preferred embodiment of the present invention. Switch 300B includes a packet relay 302B in communication with a number of ports 304B through link or network layer quality of service fields such as IP version 4's Type of Service field, identified as QOSF 306B. Generally, a switch such as switch 300B can route frames from one port to any other port on the same switch.

Figure 3C:
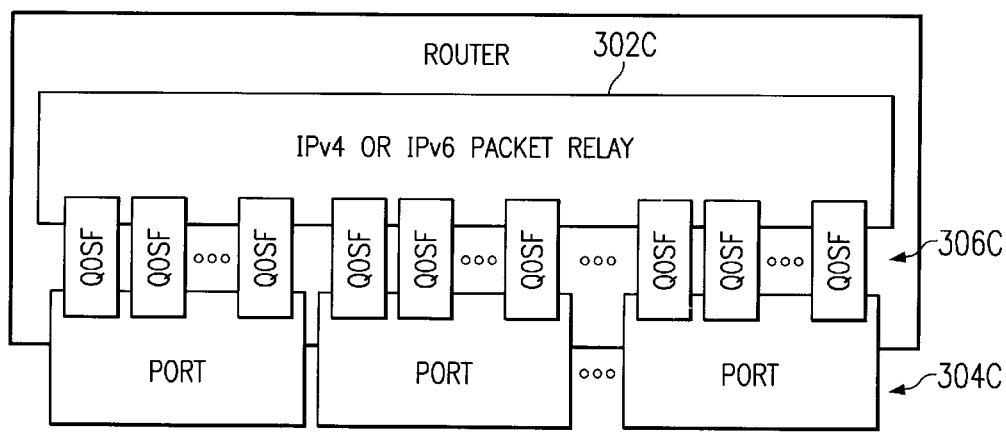
FIG. 3C is a diagram of a router in accordance with a preferred embodiment of the present invention.

Similarly, FIG. 3C depicts a router 300C in accordance with a preferred embodiment of the present invention. Router 300C includes a frame relay, such as GRH packet relay 302C in communication with a number of ports 304C through network layer quality of service fields such as IP version 4's Type of Service field, identified as QOSF 306C. Like switch 300B, router 300C will generally be able to route frames from one port to any other port on the same router.

Figure 4:
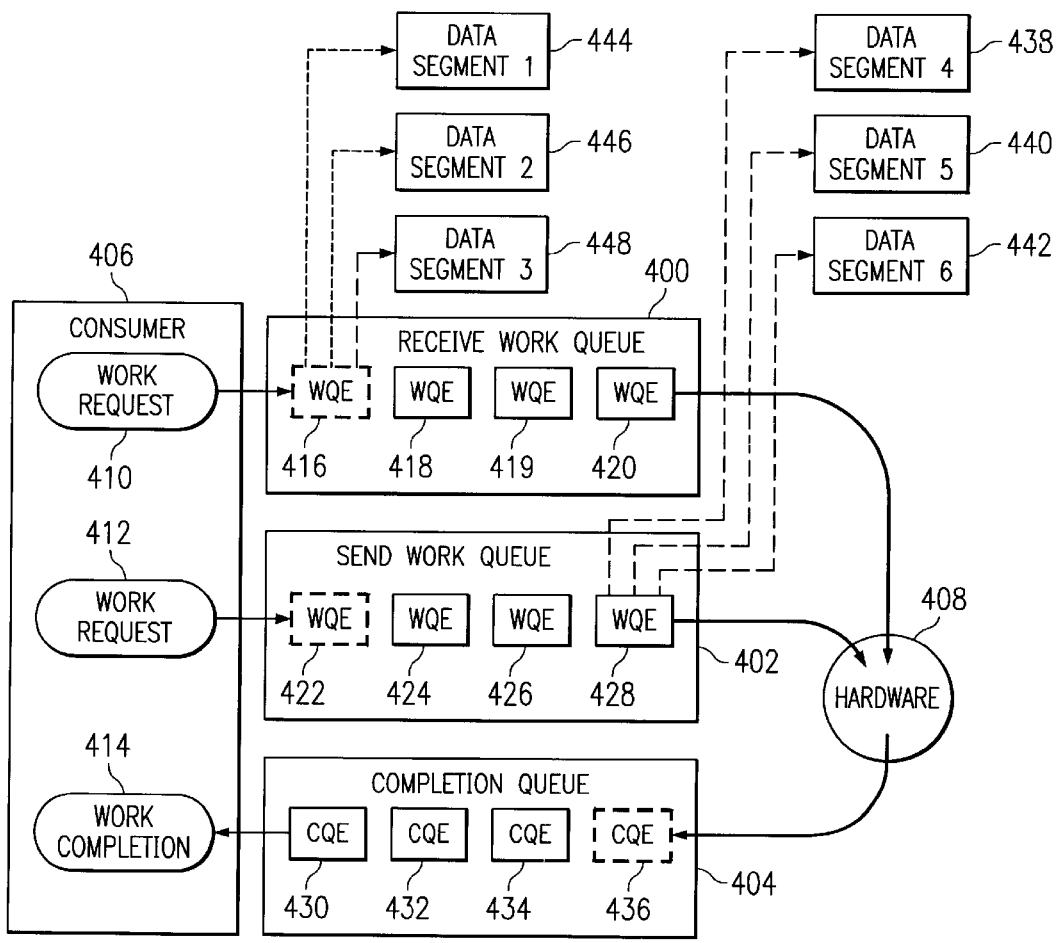
FIG. 4 is a diagram illustrating processing of work requests in accordance with a preferred embodiment of the present invention.

With reference now to FIG. 4, a diagram illustrating processing of work requests is depicted in accordance with a preferred embodiment of the present invention. In FIG. 4, a receive work queue 400, send work queue 402, and completion queue 404 are present for processing requests from and for consumer 406. These requests from consumer 406 are eventually sent to hardware 408. In this example, consumer 406 generates work requests 410 and 412 and receives work completion 414. As shown in FIG. 4, work requests placed onto a work queue are referred to as work queue elements (WQEs).

Send work queue 402 contains work queue elements (WQES) 422–428, describing data to be transmitted on the IP net fabric. Receive work queue 400 contains work queue elements (WQEs) 416–420, describing where to place incoming channel semantic data from the IP net fabric. A work queue element is processed by hardware 408 in the IPSOE.

The verbs also provide a mechanism for retrieving completed work from completion queue 404. As shown in FIG. 4, completion queue 404 contains completion queue elements (CQEs) 430–436. Completion queue elements contain information about previously completed work queue elements. Completion queue 404 is used to create a single point of completion notification for multiple queue pairs. A completion queue element is a data structure on a completion queue. This element describes a completed work queue element. The completion queue element contains sufficient information to determine the queue pair and specific work queue element that completed. A completion queue context is a block of information that contains pointers to, length, and other information needed to manage the individual completion queues.

Example work requests supported for send work queue 402 shown in FIG. 4 are as follows. A send work request is a channel semantic operation to push a set of local data segments to the data segments referenced by a remote node's receive work queue element. For example, work queue element 428 contains references to data segment 4 438, data segment 5 440, and data segment 6 442. Each of the send work request's data segments contains part of a virtually contiguous memory region. The virtual addresses used to reference the local data segments are in the address context of the process that created the local queue pair.

A remote direct memory access (RDMA) read work request provides a memory semantic operation to read a virtually contiguous memory space on a remote node. A memory space can either be a portion of a memory region or portion of a memory window. A memory region references a previously registered set of virtually contiguous memory addresses defined by a virtual address and length. A memory window references a set of virtually contiguous memory addresses that have been bound to a previously registered region.

The RDMA read work request reads a virtually contiguous memory space on a remote endnode and writes the data to a virtually contiguous local memory space. Similar to the send work request, virtual addresses used by the RDMA read work queue element to reference the local data segments are in the address context of the process that created the local queue pair. The remote virtual addresses are in the address context of the process owning the remote queue pair targeted by the RDMA read work queue element.

A RDMA write work queue element provides a memory semantic operation to write a virtually contiguous memory space on a remote node. For example, work queue element 416 in receive work queue 400 references data segment 1 444, data segment 2 446, and data segment 3 448. The RDMA write work queue element contains a scatter list of local virtually contiguous memory spaces and the virtual address of the remote memory space into which the local memory spaces are written.

A RDMA FetchOp work queue element provides a memory semantic operation to perform an atomic operation on a remote word. The RDMA FetchOp work queue element is a combined RDMA Read, Modify, and RDMA Write operation. The RDMA FetchOp work queue element can support several read-modify-write operations, such as Compare and Swap if equal. The RDMA Fetchop is not included in current RDMA over IP standardization efforts, but is described here, because it may be used as a value-added feature in some implementations.

A bind (unbind) remote access key (R_Key) work queue element provides a command to the IP Suite Offload Engine hardware to modify (destroy) a memory window by associating (disassociating) the memory window to a memory region. The R_Key is part of each RDMA access and is used to validate that the remote process has permitted access to the buffer.

In one embodiment, receive work queue 400 shown in FIG. 4 only supports one type of work queue element, which is referred to as a receive work queue element. The receive work queue element provides a channel semantic operation describing a local memory space into which incoming send messages are written. The receive work queue element includes a scatter list describing several virtually contiguous memory spaces. An incoming send message is written to these memory spaces. The virtual addresses are in the address context of the process that created the local queue pair.

For interprocessor communications, a user-mode software process transfers data through queue pairs directly from where the buffer resides in memory. In one embodiment, the transfer through the queue pairs bypasses the operating system and consumes few host instruction cycles. Queue pairs permit zero processor-copy data transfer with no operating system kernel involvement. The zero processor-copy data transfer provides for efficient support of high-bandwidth and low-latency communication.

When a queue pair is created, the queue pair is set to provide a selected type of transport service. In one embodiment, a distributed computer system implementing the present invention supports three types of transport services: TCP, SCTP, and UDP.

TCP and SCTP associate a local queue pair with one and only one remote queue pair. TCP and SCTP require a process to create a queue pair for each process that TCP and SCTP are to communicate with over the IP net fabric. Thus, if each of N host processor nodes contains P processes, and all P processes on each node wish to communicate with all the processes on all the other nodes, each host processor node requires $p^2 \times (N-1)$ queue pairs. Moreover, a process can associate a queue pair to another queue pair on the same IPSOE.

Figure 5:
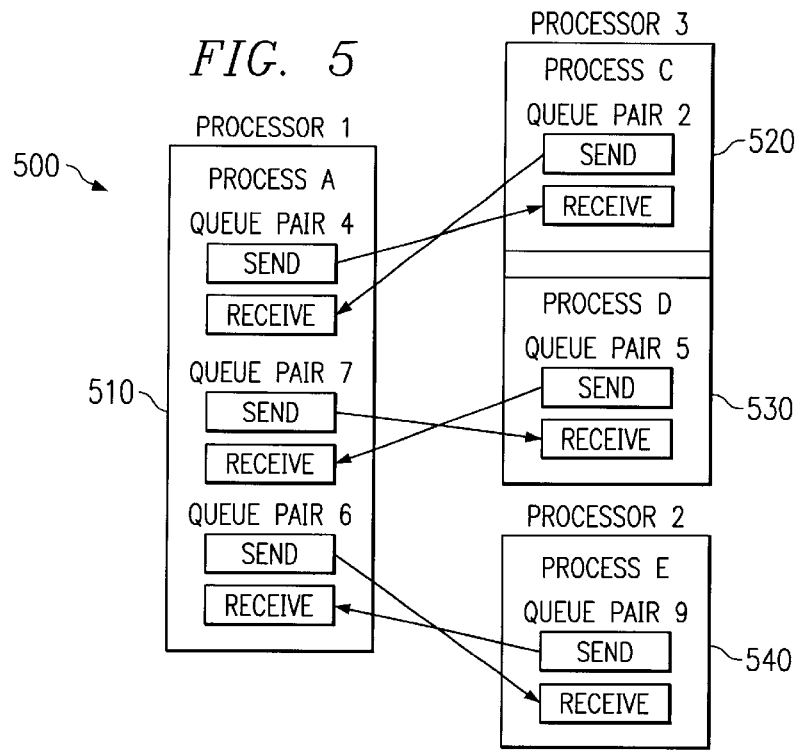
FIG. 5 is a diagram illustrating a portion of a distributed computer system in accordance with a preferred embodiment of the present invention in which a TCP or SCTP transport is used.

A portion of a distributed computer system employing TCP or SCTP to communicate between distributed processes is illustrated generally in FIG. 5. Distributed computer system 500 in FIG. 5 includes a host processor node 1, a host processor node 2, and a host processor node 3. Host processor node 1 includes a process A 510. Host processor node 3 includes a process C 520 and a process D 530. Host processor node 2 includes a process E 540.

Host processor node 1 includes queue pairs 4, 6 and 7, each having a send work queue and receive work queue. Host processor node 2 has a queue pair 9 and host processor node 3 has queue pairs 2 and 5. The TCP or SCTP of distributed computer system 500 associates a local queue pair with one and only one remote queue pair. Thus, the queue pair 4 is used to communicate with queue pair 2; queue pair 7 is used to communicate with queue pair 5; and queue pair 6 is used to communicate with queue pair 9.

A WQE placed on one send queue in a TCP or SCTP causes data to be written into the receive memory space referenced by a receive WQE of the associated queue pair. RDMA operations operate on the address space of the associated queue pair.

In one embodiment of the present invention, the TCP or SCTP is made reliable because hardware maintains sequence numbers and acknowledges all frame transfers. A combination of hardware and IP net driver software retries any failed communications. The process client of the queue pair obtains reliable communications even in the presence of bit errors, receive underruns, and network congestion. If alternative paths exist in the IP net fabric, reliable communications can be maintained even in the presence of failures of fabric switches, links, or IP Suite Offload Engine ports.

In addition, acknowledgments may be employed to deliver data reliably across the IP net fabric. The acknowledgment may, or may not, be a process level acknowledgment, i.e. an acknowledgment that validates that a receiving process has consumed the data. Alternatively, the acknowledgment may be one that only indicates that the data has reached its destination.

The User Datagram Protocol is connectionless. The UDP is employed by management applications to discover and integrate new switches, routers, and endnodes into a given distributed computer system. The UDP does not provide the reliability guarantees of the TCP or SCTP. The UDP accordingly operates with less state information maintained at each endnode.

Figure 6:
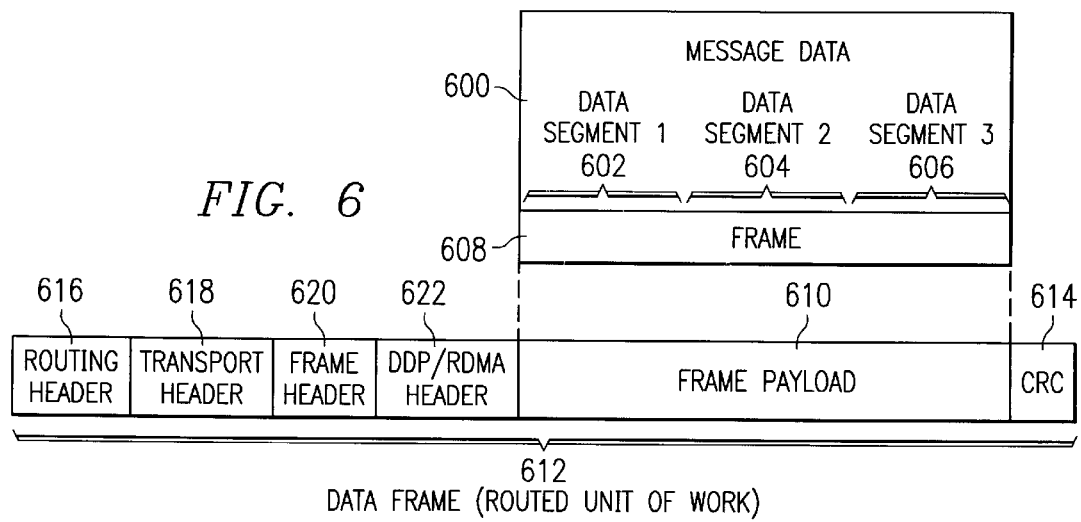
FIG. 6 is an illustration of a data frame in accordance with a preferred embodiment of the present invention.

Turning next to FIG. 6, an illustration of a data frame is depicted in accordance with a preferred embodiment of the present invention. A data frame is a unit of information that is routed through the IP net fabric. The data frame is an endnode-to-endnode construct, and is thus created and consumed by endnodes. For frames destined to an IPSOE, the data frames are neither generated nor consumed by the switches and routers in the IP net fabric. Instead for data frames that are destined to an IPSOE, switches and routers simply move request frames or acknowledgment frames closer to the ultimate destination, modifying the link header fields in the process. Routers may modify the frame's network header when the frame crosses a subnet boundary. In traversing a subnet, a single frame stays on a single service level.

Message data 600 contains data segment 1 602, data segment 2 604, and data segment 3 606, which are similar to the data segments illustrated in FIG. 4. In this example, these data segments form a frame 608, which is placed into frame payload 610 within data frame 612. Additionally, data frame 612 contains cyclic redundancy check (CRC) 614, which is used for error checking. Additionally, routing header 616 and transport header 618 are present in data frame 612. Routing header 616 is used to identify source and destination ports for data frame 612. Transport header 618 in this example specifies the sequence number and the source and destination port number for data frame 612. The sequence number is initialized when communication is established and increments by 1 for each byte of frame header, DDP/RDMA header, data payload, and CRC. Frame header 620 in this example specifies the destination queue pair number associated with the frame and the length of the Direct Data Placement and/or Remote Direct Memory Access (DDP/RDMA) header plus data payload plus CRC. DDP/RDMA header 622 specifies the message identifier and the placement information for the data payload. The message identifier is constant for all frames that are part of a message. Example message identifiers include, for example, send, write RDMA, and read RDMA.

Figure 7:
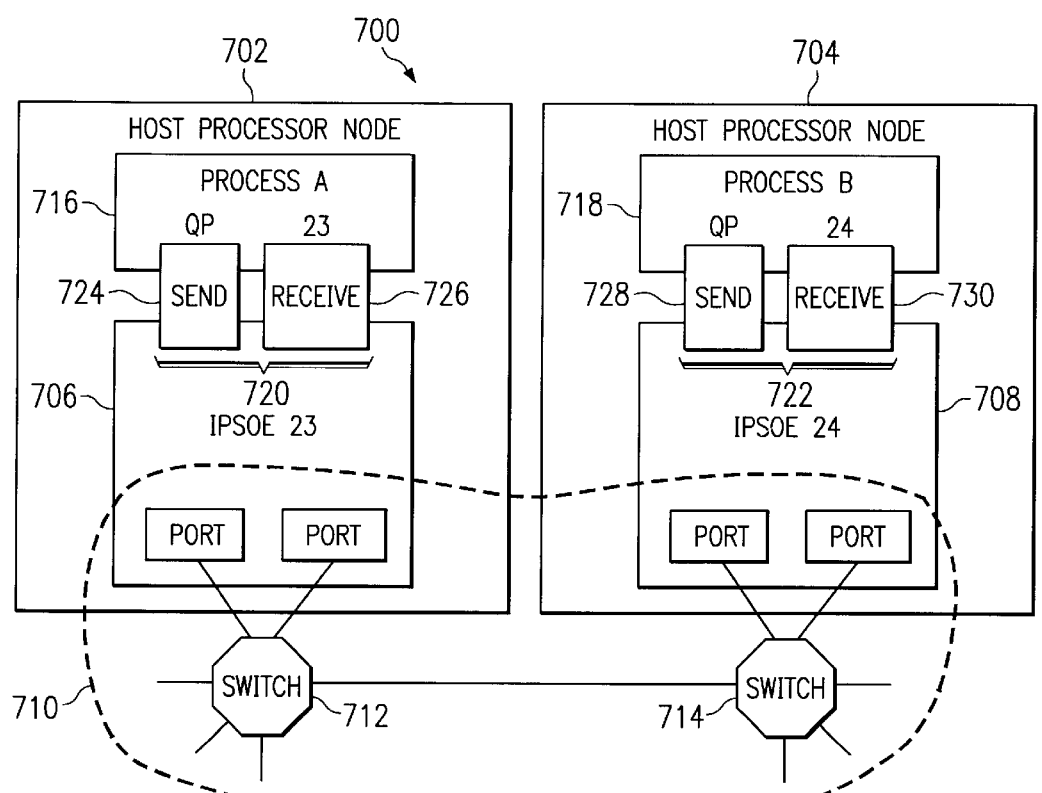
FIG. 7 is a diagram illustrating a portion of a distributed computer system to illustrate an example request and acknowledgment transaction in accordance with a preferred embodiment of the present invention.

In FIG. 7, a portion of a distributed computer system, such as distributed computer system 700 is depicted to illustrate an example request and acknowledgment transaction. Distributed computer system 700 in FIG. 7 includes a host processor node 702 running process A 716 and a host processor node 704 running process B 718. Host processor node 702 includes an IPSOE 706. Host processor node 704 includes an IPSOE 708. The distributed computer system in FIG. 7 includes IP net fabric 710, which includes switch 712 and switch 714. The IP net fabric includes a link coupling IPSOE 706 to switch 712; a link coupling switch 712 to switch 714; and a link coupling IPSOE 708 to switch 714.

In the example transactions, host processor node 702 includes a client process A. Host processor node 704 includes a client process B. Client process A interacts with host IPSOE 706 through queue pair 23 720 comprising send queue 724 and receive queue 726. Client process B interacts with host IPSOE 708 through queue pair 24 722 comprising send queue 728 and receive queue 730. Queue pairs 23 and 24 are data structures that include a send work queue and a receive work queue.

Process A initiates a message request by posting work queue elements to the send queue of queue pair 23. Such a work queue element is illustrated in FIG. 4. The message request of client process A is referenced by a gather list contained in the send work queue element. Each data segment in the gather list points to part of a virtually contiguous local memory region, which contains a part of the message, such as indicated by data segments 1, 2, and 3, which respectively hold message parts 1, 2, and 3, in FIG. 4.

Hardware in host IPSOE 706 reads the work queue element and segments the message stored in virtual contiguous buffers into data frames, such as the data frame illustrated in FIG. 6. Data frames are routed through the IP net fabric, and for reliable transfer services, are acknowledged by the final destination endnode. If not successfully acknowledged, the data frame is retransmitted by the source endnode. Data frames are generated by source endnodes and consumed by destination endnodes.

Figure 8:
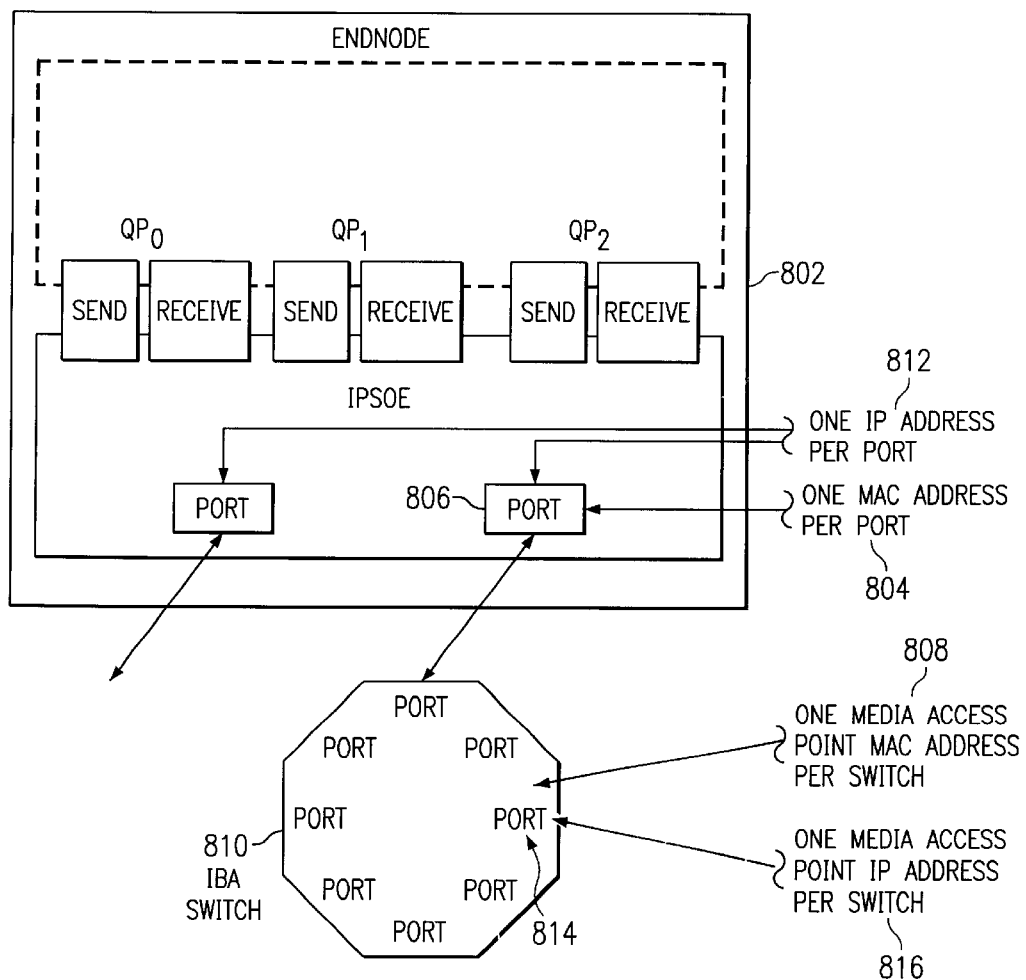
FIG. 8 is a diagram illustrating the network addressing used in a distributed networking system in accordance with the present invention.

With reference to FIG. 8, a diagram illustrating the network addressing used in a distributed networking system is depicted in accordance with the present invention. A host name provides a logical identification for a host node, such as a host processor node or I/O adapter node. The host name identifies the endpoint for messages such that messages are destined for processes residing on an endnode specified by the host name. Thus, there is one host name per node, but a node can have multiple IPSOEs.

A single link layer address (e.g. Ethernet Media Access Layer Address) 804 is assigned to each port 806 of an endnode component 802. A component can be an IPSOE, switch, or router. All IPSOE and router components must have a MAC address. A media access point on a switch is also assigned a MAC address.

One network address (e.g. IP Address) 812 is assigned to each port 806 of an endnode component 802. A component can be an IPSOE, switch, or router. All IPSOE and router components must have a network address. A media access point on a switch is also assigned a MAC address.

Figure 9:
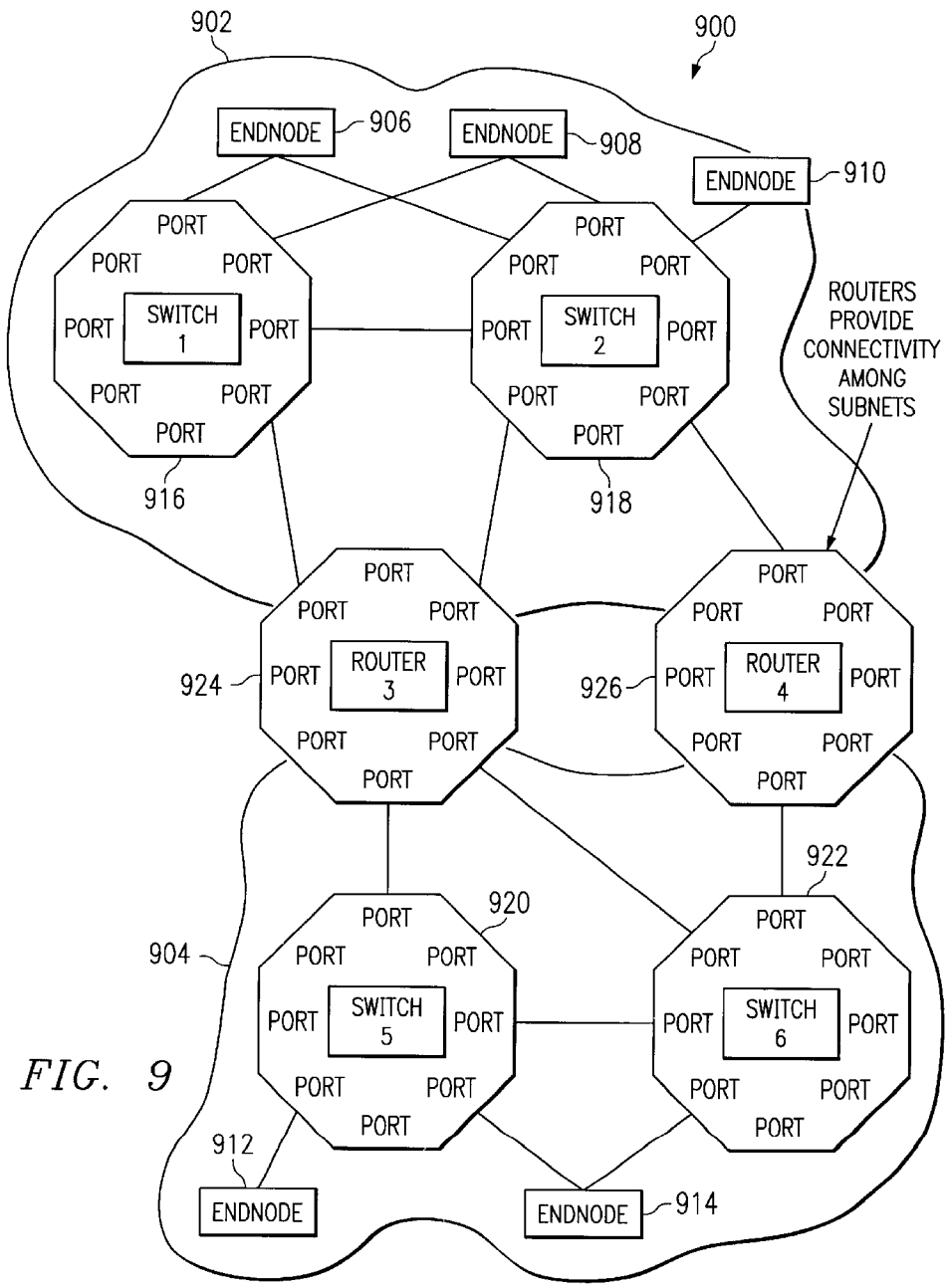
FIG. 9 is a diagram of a portion of a distributed computer system containing subnets in a preferred embodiment of the present invention.

Each port of switch 810 does not have a link layer address associated with it. However, switch 810 can have a media access port 814 that has a link layer address 816 and a network layer address 808 associated with it. A portion of a distributed computer system in accordance with a preferred embodiment of the present invention is illustrated in FIG. 9. Distributed computer system 900 includes a subnet 902 and a subnet 904. Subnet 902 includes endnodes, such as host processor nodes 906, 908, and 910. Subnet 904 includes endnodes, such as host processor nodes 912 and 914. Subnet 902 includes switches 916 and 918. Subnet 904 includes switches 920 and 922.

Routers create and connect subnets. For example, subnet 902 is connected to subnet 904 with routers 924 and 926. In one example embodiment, a subnet has up to 216 endnodes, switches, and routers.

A subnet is defined as a group of endnodes and cascaded switches that is managed as a single unit. Typically, a subnet occupies a single geographic or functional area. For example, a single computer system in one room could be defined as a subnet. In one embodiment, the switches in a subnet can perform very fast wormhole or cut-through routing for messages.

A switch within a subnet examines the destination link layer address (e.g. MAC address) that is unique within the subnet to permit the switch to quickly and efficiently route incoming message frames. In one embodiment, the switch is a relatively simple circuit, and is typically implemented as a single integrated circuit. A subnet can have hundreds to thousands of endnodes formed by cascaded switches.

As illustrated in FIG. 9, for expansion to much larger systems, subnets are connected with routers, such as routers 924 and 926. The router interprets the destination network layer address (e.g. IP address) and routes the frame.

An example embodiment of a switch is illustrated generally in FIG. 3B. Each I/O path on a switch or router has a port. Generally, a switch can route frames from one port to any other port on the same switch. Within a subnet, such as subnet 902 or subnet 904, a path from a source port to a destination port is determined by the link layer address (e.g. MAC address) of the destination host IPSOE port. Between subnets, a path is determined by the network layer address (IP address) of the destination IPSOE port and by the link layer address (e.g. MAC address) of the router port, which will be used to reach the destination's subnet.

In one embodiment, the paths used by the request frame and the request frame's corresponding positive acknowledgment (ACK) frame are not required to be symmetric. In one embodiment employing oblivious routing, switches select an output port based on the link layer address (e.g. MAC address). In one embodiment, a switch uses one set of routing decision criteria for all its input ports in the switch. In one example embodiment, the routing decision criteria are contained in one routing table. In an alternative embodiment, a switch employs a separate set of criteria for each input port.

A data transaction in the distributed computer system of the present invention is typically composed of several hardware and software steps. A client process data transport service can be a user-mode or a kernel-mode process. The client process accesses IP Suite Offload Engine hardware through one or more queue pairs, such as the queue pairs illustrated in FIGS. 3A, 5, and 8. The client process calls an operating system specific programming interface, which is herein referred to as "verbs." The software code implementing verbs posts a work queue element to the given queue pair work queue.

There are many possible methods of posting a work queue element and there are many possible work queue element formats, which allow for various cost/performance design points, but which do not affect interoperability. A user process, however, must communicate to verbs in a well-defined manner, and the format and protocols of data transmitted across the IP net fabric must be sufficiently specified to allow devices to interoperate in a heterogeneous vendor environment.

In one embodiment, IPSOE hardware detects work queue element postings and accesses the work queue element. In this embodiment, the IPSOE hardware translates and validates the work queue element's virtual addresses and accesses the data.

An outgoing message is split into one or more data frames. In one embodiment, the IPSOE hardware adds a DDP/RDMA header, frame header and CRC, transport header and a network header to each frame. The transport header includes sequence numbers and other transport information. The network header includes routing information, such as the destination IP address and other network routing information. The link header contains the destination link layer address (e.g. MAC address) or other local routing information.

If a TCP or SCTP is employed, when a request data frame reaches its destination endnode, acknowledgment data frames are used by the destination endnode to let the request data frame sender know the request data frame was validated and accepted at the destination. Acknowledgment data frames acknowledge one or more valid and accepted request data frames. The requester can have multiple outstanding request data frames before it receives any acknowledgments. In one embodiment, the number of multiple outstanding messages, i.e. request data frames, is determined when a queue pair is created.

Figure 10:
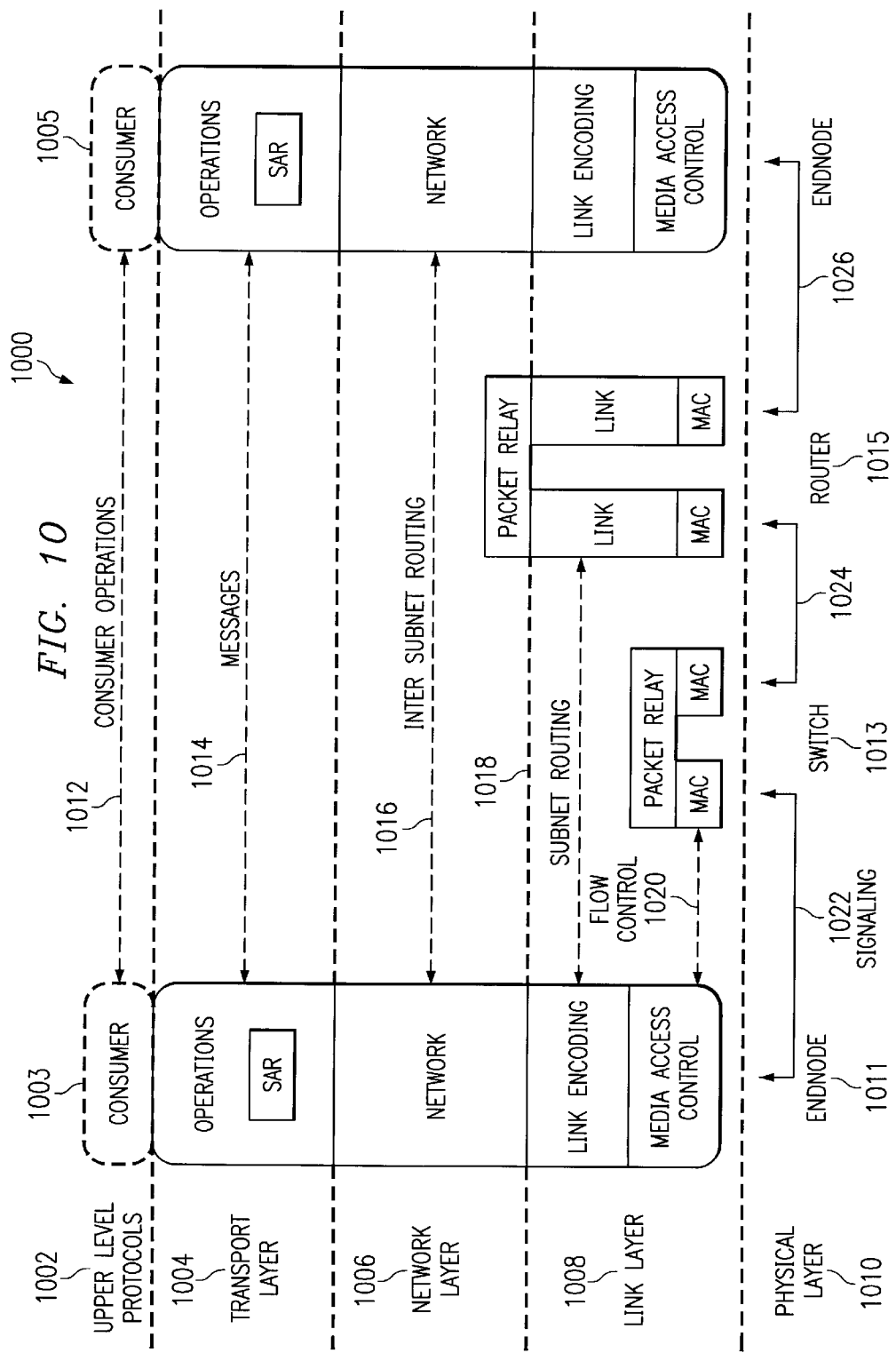
FIG. 10 is a diagram of a layered communication architecture used in a preferred embodiment of the present invention.

One embodiment of a layered architecture 1000 for implementing the present invention is generally illustrated in diagram form in FIG. 10. The layered architecture diagram of FIG. 10 shows the various layers of data communication paths, and organization of data and control information passed between layers.

IPSOE endnode protocol layers (employed by endnode 1011, for instance) include upper level protocols 1002 defined by consumer 1003, transport layer 1004; network layer 1006, link layer 1008, and physical layer 1010. Switch layers (employed by switch 1013, for instance) include link layer 1008 and physical layer 1010. Router layers (employed by router 1015, for instance) include network layer 1006, link layer 1008, and physical layer 1010.

Layered architecture 1000 generally follows an outline of a classical communication stack in order to complete consumer operations 1012 of transferring data between consumers 1003 and 1005. With respect to the protocol layers of endnode 1011, for example, upper level protocols 1002 employs verbs to create messages at transport layer 1004. Transport layer 1004 passes messages 1014 to network layer 1006. Network layer 1006 routes frames between network subnets 1016. Link layer 1008 routes frames within a network subnet 1018. Physical layer 1010 sends bits or groups of bits to the physical layers of other devices. Each of the layers is unaware of how the upper or lower layers perform their functionality.

Consumers 1003 and 1005 represent applications or processes that employ the other layers for communicating between endnodes. Transport layer 1004 provides end-to-end message movement. In one embodiment, the transport layer provides four types of transport services as described above which are traditional TCP, RDMA over TCP, SCTP, and UDP. Network layer 1006 performs frame routing through a subnet or multiple subnets to destination endnodes. Link layer 1008 performs flow-controlled 1020, error checked, and prioritized frame delivery across links.

Physical layer 1010 performs technology-dependent bit transmission. Bits or groups of bits are passed between physical layers via links 1022, 1024, and 1026. Links can be implemented with printed circuit copper traces, copper cable, optical cable, or with other suitable links.

Figure 11:
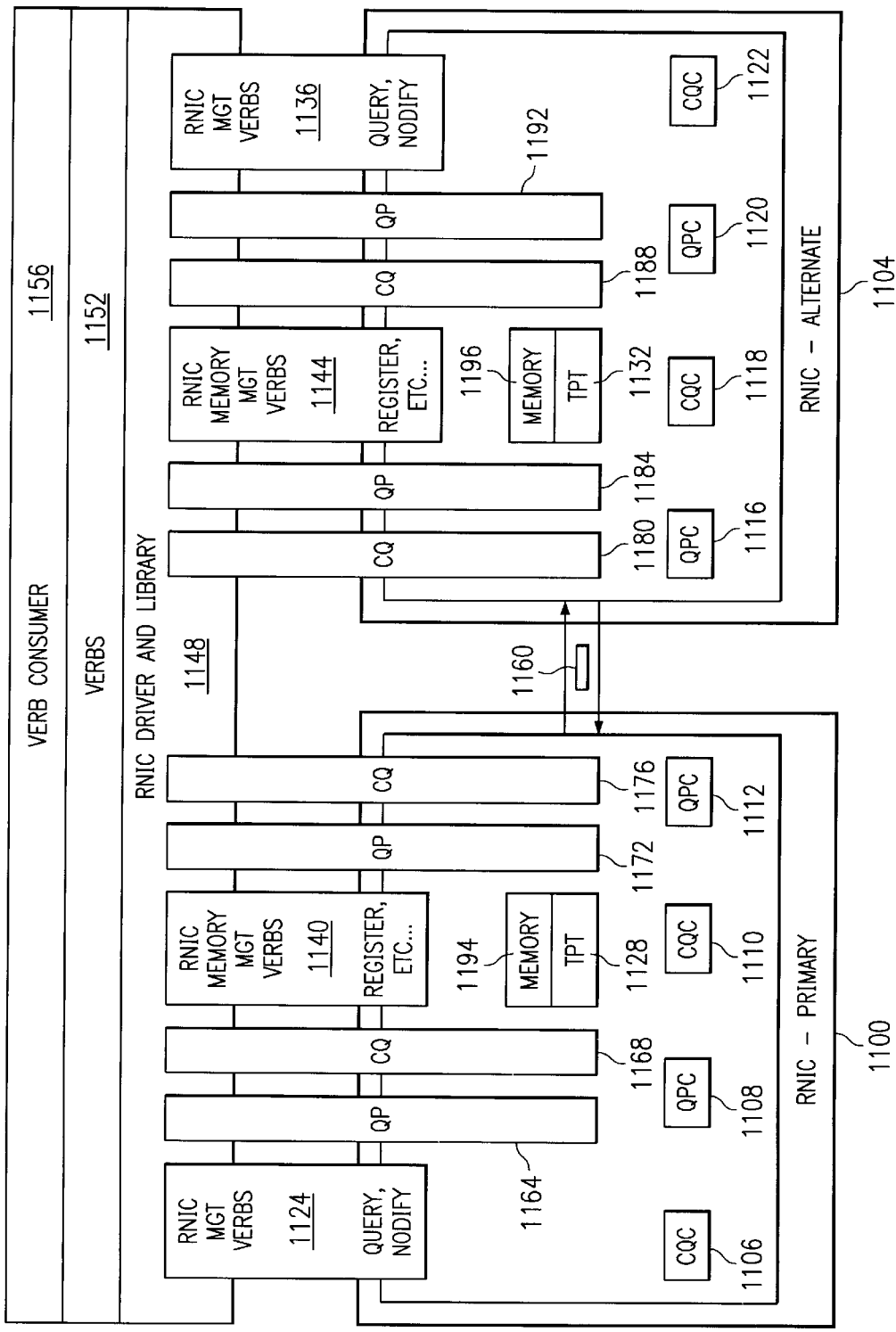
FIG. 11 depicts a schematic diagram illustrating the RNIC interfaces to the host software in accordance with the present invention.

Referring to FIG. 11, a diagram illustrating the RNIC Interfaces to host software is depicted in accordance with an exemplary embodiment of the present invention. The verb consumer 1156 accesses the primary RNIC 1100 and alternate RNIC 1104 through the verbs 1152 and the verbs driver and library 1148. The verbs consumer 1156 determines that primary RNIC 1100 and alternate RNIC 1104 support switchover/switchback (S/S) by invoking the RNIC management query verb 1124 and 1136 respectively. The RNIC management query verb returns the RNIC capabilities, which, in this exemplary embodiment, include a field that indicates the RNIC supports switchover/switchback (S/S). The verb consumer 1156 next uses the RNIC management modify verb 1124 and 1136 to assign a range of Queue Pairs (QPs), Completion Queues (CQs), and Memory Translation and Protection Table (TPT) entries to S/S and non-S/S support. As a result of successfully completing the RNIC modify verb, the primary RNIC 1100 and alternate RNIC 1104 share a common QP, CQ, and Memory TPT range.

The verbs consumer 1156 creates a CQ using a Create CQ verb, which selects whether the CQ will support S/S, such as CQ 1176 and 1180, or not, such as QP 1168 and 1188. If the verb consumer selects S/S support, then the create CQ verb includes additional modifiers to identify the primary RNIC, the primary RNIC port, the alternate RNIC, and the alternate RNIC port. The RNIC identifier can be a EUI-64 bit identifier. The port identifier can be a port number. Another alternative would be to use the RNIC's MAC address to identify both the RNIC and the port. If the verb consumer selects S/S support, then the RNIC and port identifiers are placed in the CQ context 1110 and 1118. If the verb consumer does not select S/S support, then the RNIC and port identifiers are not placed in the CQ context 1106 and 1122.

The verbs consumer 1156 registers a memory region using one of the Register Memory Region verbs (e.g. Register Memory Region, Register Shared Memory Region, Register Physical Memory Region), which select whether the memory region will support S/S, such as memory region 1128 and 1132, or not, such as memory region 1194 and 1196. If the verb consumer selects S/S support, then the register memory region verb includes additional modifiers to identify the primary RNIC, the primary RNIC port, the alternate RNIC, and the alternate RNIC port. The RNIC identifier can be a EUI-64 bit identifier. The port identifier can be a port number. Another alternative would be to use RNIC's MAC address to identify both the NIC and the port. If the verb consumer selects S/S support, then the RNIC and port identifiers may be placed in the memory region's Memory Translation and Protection Table (TPT) entry 1128 and 1132. If the verb consumer does not select S/S support, then the RNIC and port identifiers are not placed in the memory region's Memory TPT entry 1194 and 1196.

The verbs consumer 1156 creates a QP using a Create QP verb, which selects whether the QP will support S/S, such as QP 1172 and 1184, or not, such as QP 1164 and 1192. If the verb consumer selects S/S support, then the create QP verb includes additional modifiers to identify the primary RNIC, the primary RNIC port, the alternate RNIC, and the alternate RNIC port. The RNIC identifier can be a EUI-64 bit identifier. The port identifier can be a port number. Another alternative would be to use RNIC's MAC address to identify both the RNIC and the port. If the verb consumer selects S/S support, then the RNIC and port identifiers are placed in the QP context 1112 and 1116. If the verb consumer does not select S/S support, then the RNIC and port identifiers are not placed in the QP context 1108 and 1120.

When a S/S QP is operating without an alternate for example after a switchover that occurred due to an outage, the verbs consumer 1156 uses the Modify QP verb, to quiesce a S/S QP, such as QP 1172 and 1184, and reassign an alternate RNIC with the same QP number. The Modify QP verb includes modifiers to identify the primary RNIC, the primary RNIC port, the alternate RNIC, and the alternate RNIC port. The RNIC identifier can be a EUI-64 bit identifier. The port identifier can be a port number. Another alternative would be to use RNIC's MAC address to identify both the NIC and the port. The RNIC and port identifiers are placed in the QP context 1112 and 1116.

When a S/S RNIC is operating without an alternate for example after a switchover that occurred due to an outage, the verbs consumer 1156 uses the Resync Registration verb, to essentially register all Memory TPT entries, such as 1128, with the alternate RNIC.

After all S/S QPs associated with a given S/S CQ, that has been operating without an alternate, have been quiesced the verbs consumer 1156 uses the Modify CQ verb, to quiesce a S/S CQ, such as CQ 1176 and 1180, and reassign an alternate RNIC with the same CQ number. The Modify CQ verb includes modifiers to identify the primary RNIC, the primary RNIC port, the alternate RNIC, and the alternate RNIC port. The RNIC identifier can be a EUI-64 bit identifier. The port identifier can be a port number. Another alternative would be to use the RNIC's MAC address to identify both the RNIC and the port. The RNIC and port identifiers are placed in the CQ context 1110 and 1118.

After the S/S CQs has been quiesced, the Modify CQ verb is used to place the CQ in an active state (such as a ready to use state) and for each S/S QP associated with the CQ, the Modify QP verb is used to place the QP in an active state (such as the ready to send state).

Figure 12:
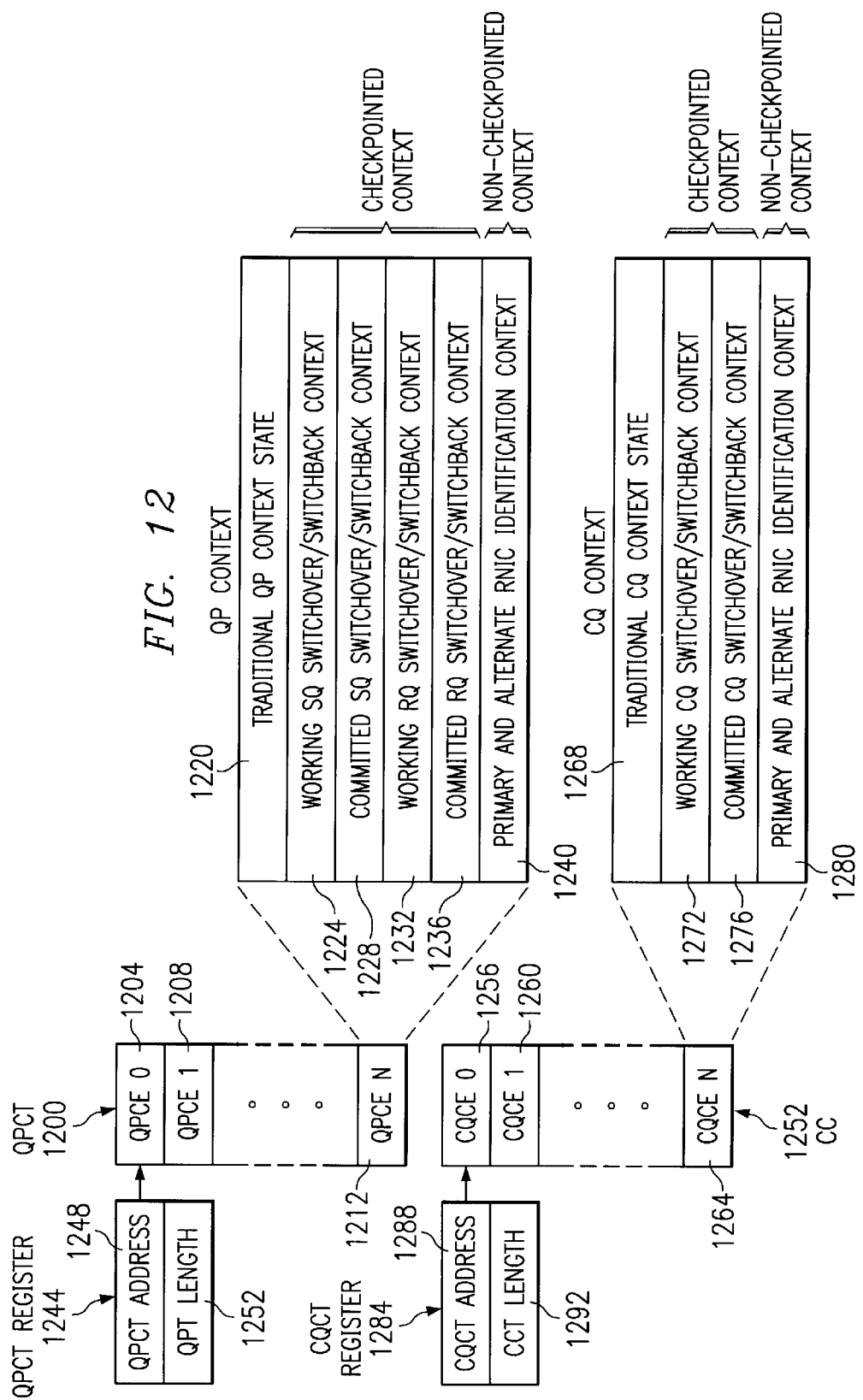
FIG. 12 depicts a schematic diagram illustrating an exemplary connection state related to switchover and switchback that is maintained by two RNICs in accordance with the present invention.

Referring to FIG. 12, a diagram illustrating an exemplary connection state related to switchover and switchback that is maintained by two RNICs in accordance with the present invention is provided. In a preferred embodiment, each primary, alternate, or single RNIC maintains the state information shown in FIG. 12. The state information can be maintained, for example, within the RNIC, in a host memory location accessible by the RNIC, a combination of the two, or the like. FIG. 12 shows an exemplary case where the state information is maintained within the RNIC.

Each RNIC QP, such as QP 1172, has a QP context entry, such as QPCE0 1204, QPCE1 1208, and QPCEN 1212, in a QP Context Table (QPCT), such as QPCT 1200. The QPCT 1200 is accessed through the QP Context Table Register, such as QPCT Register 1244, which contains the address of the QPCT, such as QPCT Address 1248, and a length of the QPCT, such as QPCT Length 1252. Each entry in the QP Context Table 1200 has a fixed size, though a QPCT with variable sized QPCT entries could also be used. Each entry in the QPCT contains relevant Context information associated with the QP number referenced for that entry. For example, QPCE N 1212, contains the QP state information associated with QP number N. The state for QP number N includes: a traditional QP context state, such as Traditional QP Context State 1220, a working SQ switchover/switchback context state, such as Working SQ Switchover/Switchback context 1224, a committed SQ switchover/switchback context state, such as Committed SQ Switchover/Switchback context 1228, a working RQ switchover/switchback context state, such as Working RQ Switchover/Switchback context 1232, a committed RQ switchover/switchback context state, such as Committed RQ Switchover/Switchback context 1236, and a primary and alternate RNIC identification context state, such as Primary and Alternate RNIC Identification Context 1240.

The traditional QP Context State 1220, contains well-known QP Context State information, such as the state of the QP, the type of service associated with the QP, TCP source port and destination numbers associated with the QP, IP source and destination addresses associated with the QP.

The Working SQ Switchover/Switchback context 1224 contains the following information, which is set to zero when the QP is created:

---

Working Current Send WQE number
Working Byte offset into current Send WQE
Working Sequence number for next Send TCP segment
Working Window for value for next Send TCP segment
Working Current Receive Ack WQE Number
Working Byte offset into Current Receive Ack WQE
Working Sequence number for next Rcv Ack TCP segment
Working Window value for next Rcv Ack TCP segment

---

All the Working SQ Switchover/Switchback fields contain information that has not been checkpointed through a Checkpoint ACK by the alternate RNIC. Both the primary RNIC and the alternate RNIC contain all these fields. The "Working current Send WQE number" identifies the WQE that is currently being processed on the Send Queue. The "Working byte offset into current Send WQE" identifies the next byte to be processed for the Working Current Send WQE. The "Working Sequence number for next Send TCP Segment" identifies the TCP Sequence Number to be used for the Working byte offset into current Send WQE. The "Working Window value for the next Send TCP Segment" identifies the TCP Window size available for the next TCP Segment to be sent starting at the Working byte offset into current Send WQE. The "Working current Receive ACK WQE number" identifies the WQE currently being processed on the Send Queue that has been acknowledged by the remote node. The "Working byte offset into current Receive ACK WQE" identifies the next byte to be acknowledged by the remote node for the Working Current Receive ACK WQE. The "Working Sequence number for next Receive ACK TCP Segment" identifies the next TCP Sequence Number which is expected from the remote node and is associated with the Working byte offset into current Receive ACK WQE. The "Working Window value for the next Receive ACK TCP Segment" identifies the change in the Send Window that resulted from last TCP Window size sent back from the remote node and is associated with the Working byte offset into current Receive ACK WQE.

The Committed SQ Switchover/Switchback context 1228 contains the following information, which is set to zero when the QP is created:

---
Committed Current Send WQE number
Committed Byte offset into current Send WQE
Committed Sequence number for next Send TCP segment
Committed Window for value for next Send TCP segment
Committed Current Receive Ack WQE Number
Committed Byte offset into Current Receive Ack WQE
Committed Sequence number for next Rcv Ack TCP segment
Committed Window value for next Rcv Ack TCP segment
---

All the Committed SQ Switchover/Switchback fields contain information that has been checkpointed through a Checkpoint ACK by the alternate RNIC. Both the primary RNIC and the alternate RNIC contain all these fields. The "Committed current Send WQE number" identifies the WQE that has been checkpointed and is currently being processed on the Send Queue. The "Committed byte offset into current Send WQE" identifies the next byte to be checkpointed for the Committed Current Send WQE. The "Committed Sequence number for next Send TCP Segment" identifies the TCP Sequence Number to be used for the Committed byte offset into current Send WQE. The "Committed Window value for the next Send TCP Segment" identifies the TCP Window size available for the next TCP Segment to be sent starting at the Committed byte offset into current Send WQE. The "Committed current Receive ACK WQE number" identifies the most recent WQE checkpointed on the Send Queue that has been acknowledged by the remote node. The "Committed byte offset into current Receive ACK WQE" identifies the next byte to be acknowledged by the remote node for the Committed Current Receive ACK WQE. The "Committed Sequence number for next Receive ACK TCP Segment" identifies the next TCP Sequence Number which is expected from the remote node and is associated with the Committed byte offset into current Receive ACK WQE. The "Committed Window value for the next Receive ACK TCP Segment" identifies the change in the Send Window that resulted from the last TCP Window size sent back from the remote node and is associated with the Committed byte offset into current Receive ACK WQE.

The Working RQ Switchover/Switchback context 1232 contains the following information, which is set to zero when the QP is created:

---
Working Current Receive WQE number
Working Byte offset into current Receive WQE
Working Sequence number for next Receive TCP segment
Working Window for value for next Receive TCP segment
Working Current Send Ack WQE Number
Working Byte offset into Current Send Ack WQE
Working Sequence number for next Send Ack TCP segment
Working Window value for next Send Ack TCP segment
---

All the Working RQ Switchover/Switchback fields contain information that has not been checkpointed through a Checkpoint ACK by the alternate RNIC. Both the primary RNIC and the alternate RNIC contain all these fields. The "Working current Receive WQE number" identifies the WQE that is currently being processed on the Receive Queue. The "Working byte offset into current Receive WQE" identifies the next byte to be processed for the Working Current Receive WQE. The "Working Sequence number for next Receive TCP Segment" identifies the TCP Sequence Number expected for the Working byte offset into current Receive WQE. The "Working Window value for the next Receive TCP Segment" identifies the TCP Window size available for the next TCP Segment to be received starting at the Working byte offset into current Receive WQE. The "Working current Send ACK WQE number" identifies the WQE currently being processed on the Receive Queue for which an acknowledgment has been sent to the remote node. The "Working byte offset into current Send ACK WQE" identifies the next byte to be acknowledged to the remote node for the Working Current Send ACK WQE. The "Working Sequence number for next Send ACK TCP Segment" identifies the next TCP Sequence Number which shall be sent to the remote node and is associated with the Working byte offset into current Send ACK WQE. The "Working Window value for the next Send ACK TCP Segment" identifies the next TCP Window size to be sent to the remote node and is associated with the Working byte offset into current Send ACK WQE.

The Committed RQ Switchover/Switchback context 1236 contains the following information, which is set to zero when the QP is created:

---
Committed Current Receive WQE number
Committed Byte offset into current Receive WQE
Committed Sequence number for next Receive TCP segment
Committed Window for value for next Receive TCP segment
Committed Current Send Ack WQE Number
Committed Byte offset into Current Send Ack WQE
Committed Sequence number for next Send Ack TCP segment
Committed Window value for next Send Ack TCP segment
---

All the Committed RQ Switchover/Switchback fields contain information that has not been checkpointed through a Checkpoint ACK by the alternate RNIC. Both the primary RNIC and the alternate RNIC contain all these fields. The "Committed current Receive WQE number" identifies the most recent WQE that has been checkpointed and is currently being processed on the Receive Queue. The "Committed byte offset into current Receive WQE" identifies the next byte to be processed for the Committed Current Receive WQE. The "Committed Sequence number for next Receive TCP Segment" identifies the TCP Sequence Number to expected for the Committed byte offset into current Receive WQE. The "Committed Window value for the next Receive TCP Segment" identifies the TCP Window size available for the next TCP Segment to be received starting at the Committed byte offset into current Receive WQE. The "Committed current Send ACK WQE number" identifies the most recent WQE checkpointed on the Receive Queue for which an acknowledgment has been sent to the remote node. The "Committed byte offset into current Send ACK WQE" identifies the next byte to be acknowledged to the remote node for the Committed Current Send ACK WQE. The "Committed Sequence number for next Send ACK TCP Segment" identifies the next TCP Sequence Number which shall be sent to the remote node and is associated with the Committed byte offset into current Send ACK WQE. The "Committed Window value for the next Send ACK TCP Segment" identifies the next TCP Window size to be sent to the remote node and is associated with the Committed byte offset into current Send ACK WQE.

The Primary and Alternate RNIC Identification Context 1240 contains the following information.

---
RNIC Switchover/Switchback State
Primary RNIC Identifier
Primary RNIC Port Identifier
Alternate RNIC Identifier
Alternate RNIC Port Identifier
---

When the QP is created the RNIC Switchover/Switchback (S/S) state is passed as an input modifier of the Create QP verb. If the RNIC S/S State is zero, the QP has S/S disabled and only the primary fields are valid. If the RNIC S/S State is non-zero, the QP has S/S enabled and both the primary and alternate fields are valid.

The Primary RNIC Identifier is used to uniquely identify the primary RNIC. For example, the RNIC identifier can be the EIU-64 value of the RNIC. The Primary RNIC Port Identifier is used to uniquely identify the port the QP is associated with on the primary RNIC. For example, the RNIC Port Identifier can be a port number or a combination of the MAC and IP address. The Alternate RNIC Identifier is used to uniquely identify the alternate RNIC. The Alternate RNIC Port Identifier is used to uniquely identify the port the QP is associated with on the alternate RNIC.

Each RNIC CQ, such as QP 1176, has a CQ context entry, such as CQCE0 1256, CQCE1 1260, and CQCEN 1264, in the CQ Context Table (CQCT), such as CQCT 1252. The CQCT is accessed through the CQ Context Table Register, such as CQCT Register 1284, which contains the address of the CQCT, such as CQCT Address 1288, and a length of the CQCT, such as CQCT Length 1292. Each entry in the QP Context Table has a fixed size, though a CQCT with variable sized CQCT Entries could also be used. Each entry in the CQCT contains relevant Context information associated with the CQ number referenced for that entry. For example, CQCE N 1264, contains all the QP state associated with CQ number N. The state for CQ number N includes: traditional CQ context state, such as Traditional QP Context State 1268, a working CQ switchover/switchback context state, such as Working CQ Switchover/Switchback context 1272, a committed CQ switchover/switchback context state, such as Committed CQ Switchover/Switchback context 1276, and a primary and alternate RNIC identification context state, such as Primary and Alternate RNIC Identification Context 1280.

The traditional CQ Context State 1268, contains well-known CQ Context State information, such as the state of the CQ and the total number of entries in the CQ.

The Working CQ Switchover/Switchback context 1272 contains the following information, which is set to zero when the QP is created:

---
Working Current Completion CQE number
---

The Working CQ Switchover/Switchback field contains information that has not been checkpointed through a Checkpoint ACK by the alternate RNIC. Both the primary RNIC and the alternate RNIC contain all these fields. The "Working current Completion CQE number" identifies the CQE that is currently being processed on the Completion Queue.

The "Committed CQ Switchover/Switchback context 1272 contains the following information, which is set to zero when the QP is created:

---
Committed Current Completion CQE number
---

The Committed CQ Switchover/Switchback field contains information that has been checkpointed through a Checkpoint ACK by the alternate RNIC. Both the primary RNIC and the alternate RNIC contain all these fields. The "Working current Completion CQE number" identifies the CQE that has been checkpointed and is currently being processed on the Completion Queue.

The Primary and Alternate RNIC Identification Context 1280 contains the following information.

---
RNIC Switchover/Switchback State
Primary RNIC Identifier
Primary RNIC Port Identifier
Alternate RNIC Identifier
Alternate RNIC Port Identifier
---

When the QP is created the RNIC Switchover/Switchback (S/S) state is passed as an input modifier of the Create QP verb. If the RNIC S/S State is zero, the CQ has S/S disabled and only the primary fields are valid. In this case, only QPs that have RNICs with S/S disabled can be associated with the CQ.

If the RNIC S/S State is non-zero the CQ has S/S enabled and both the primary and alternate fields are valid. In this case, only QPs with matching primary and alternate RNICs can be associated with the CQ.

The Primary RNIC Identifier is used to uniquely identify the primary RNIC. For example, the RNIC identifier can be the EIU-64 value of the RNIC. The Primary RNIC Port Identifier is used to uniquely identify the port the CQ is associated with on the primary RNIC. For example, the RNIC Port Identifier can be a port number or a combination of the MAC and IP address. The Alternate RNIC Identifier is used to uniquely identify the alternate RNIC. The Alternate RNIC Port Identifier is used to uniquely identify the port the CQ is associated with on the alternate RNIC.

Figure 13A:
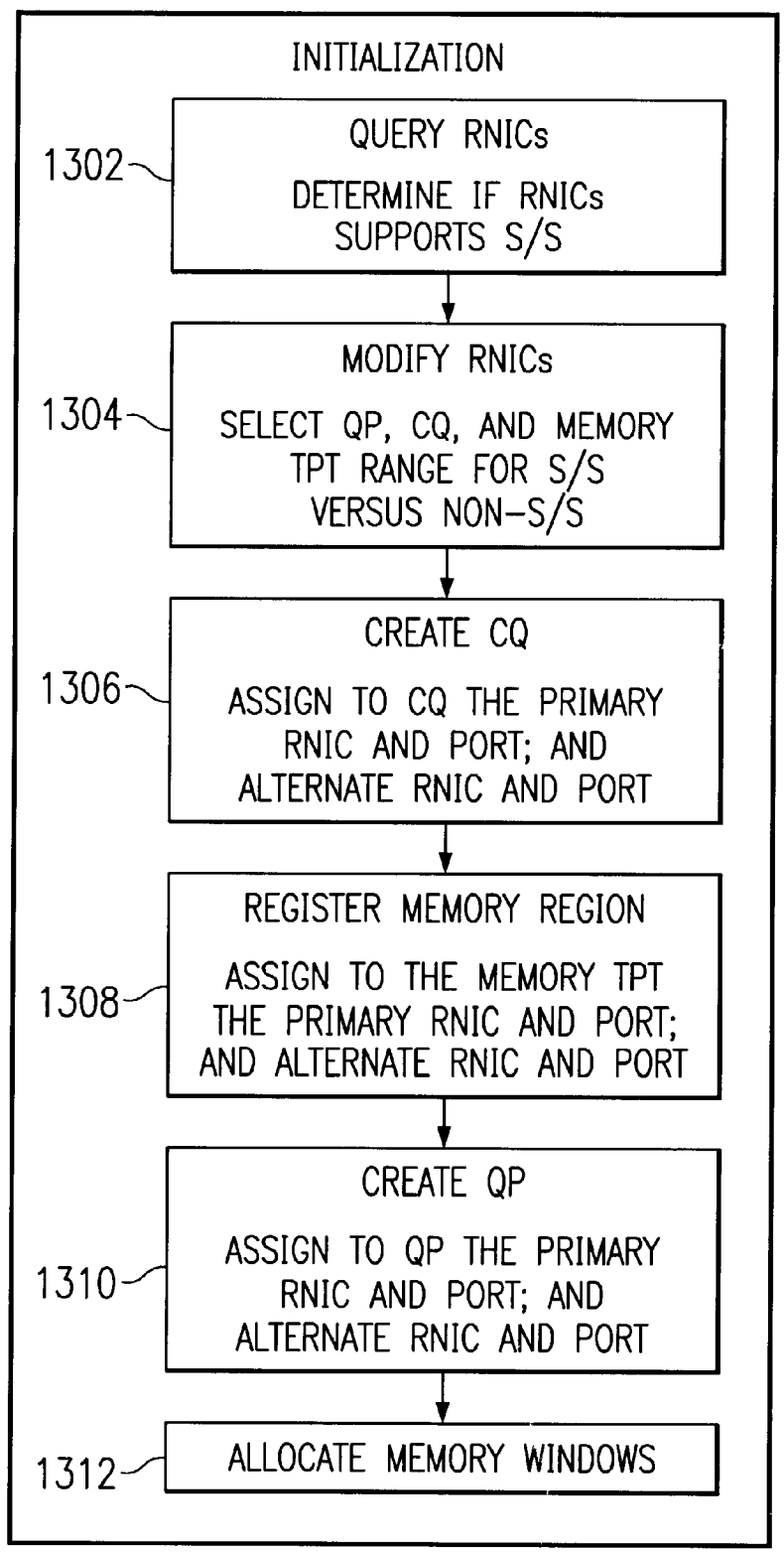
FIG. 13A depicts a flowchart outlining an exemplary initialization process of a connection across two RNICs in accordance with the present invention.

Referring to FIG. 13A, a flowchart illustrating an exemplary initialization process of a connection across two RNICs in accordance with the present invention is provided. As shown in FIG. 13A, the operation starts with a query of the RNICs to determine if they support Switchover/Switchback (step 1302). This step queries both the RNIC that will be chosen as the Primary RNIC, as well as the RNIC that will be chosen as the Alternate RNIC. For each RNIC that supports S/S, and the host wants to configure it as S/S RNICs, the host issues a Modify RNIC verb (step 1304). The Modify RNIC verb selects the range of QP numbers, the range of CQ numbers, and the range of Memory Translation and Protection Table entries that will be configured for S/S and non-S/S.

For each CQ that is created, the host issues a Create CQ verb (step 1306). The Create CQ verb specifies the Primary RNIC, the Primary RNIC Port, the Alternate RNIC, and the Alternate RNIC Port associated with the CQ. For each Memory Region that is registered through one of the Register Memory Region verbs, the host specifies the Primary RNIC, the Primary RNIC Port, the Alternate RNIC, and the Alternate RNIC Port associated with the Memory Region (step 1308).

For each QP that is created, the host issues a Create QP verb (step 1310). The Create QP verb specifies the RNIC State (Primary or Alternate), Primary RNIC, the Primary RNIC Port, the Alternate RNIC, and the Alternate RNIC Port associated with the QP.

For each Memory Window that is allocated through the Allocate Memory Window verb (step 1312), the host specifies the Primary RNIC, the Primary RNIC Port, the Alternate RNIC, and the Alternate RNIC Port associated with the Memory Window (step 1312). As a result, the connection between the two RNICs, i.e. the Primary and Alternate RNICs, is initialized.

Figure 13B:
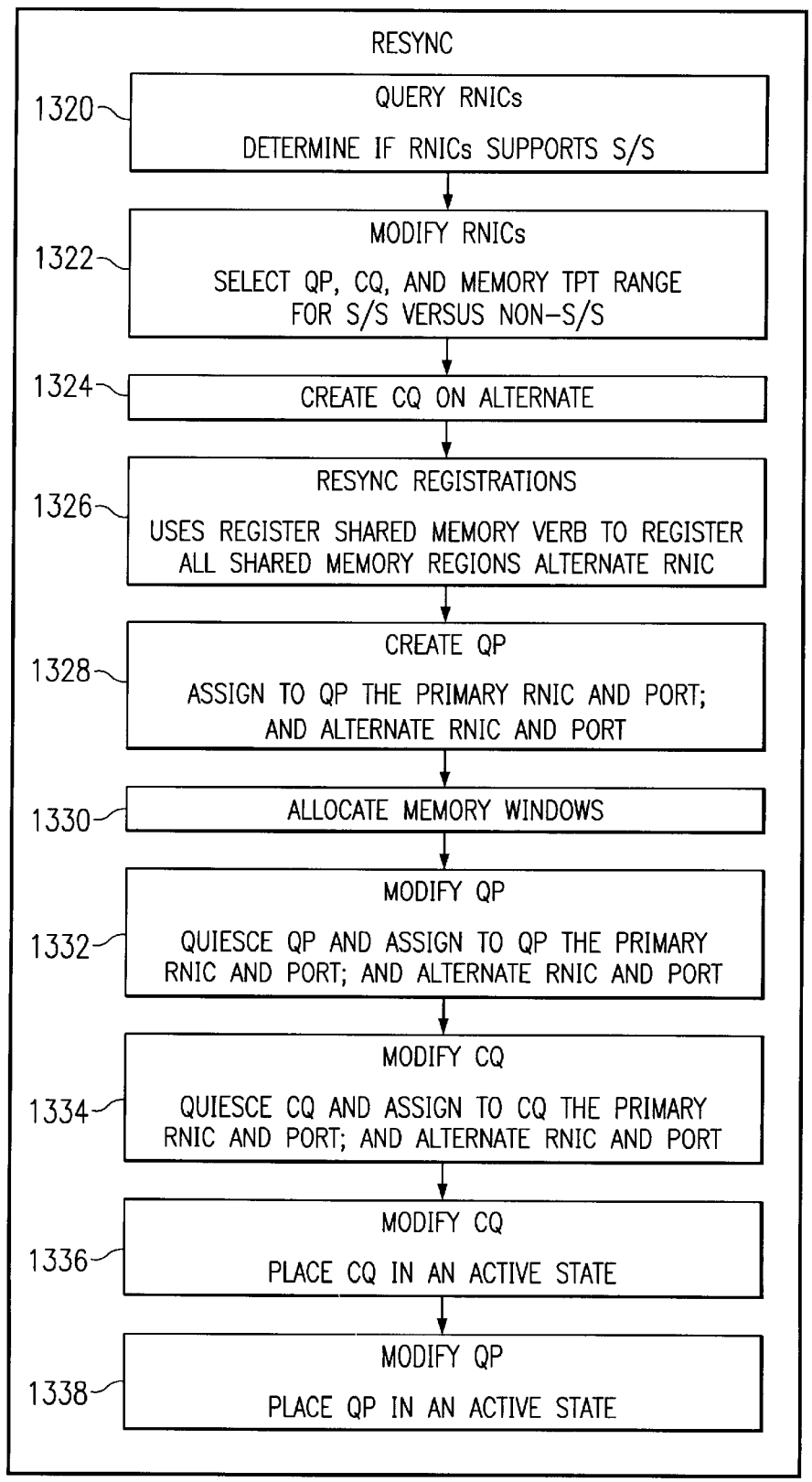
FIG. 13B depicts a flowchart outlining an exemplary resynchronization process of a connection across two RNICs in accordance with the present invention.

FIG. 13B is a flowchart of an exemplary resynchronization process of a connection across two RNICs in accordance with the present invention. The Resynchronization process is used to assign an Alternate RNIC to a QP that has been configured as a S/S QP, on a Primary RNIC that has been configured to support S/S, but is operating without an Alternate RNIC.

As shown in FIG. 13B, the operation starts with a query of the Primary RNIC to determine the range of QP numbers, the range of CQ numbers, and the range of Memory Translation and Protection Table entries that will be configured for S/S and non-S/S (step 1320). The Alternate RNIC is also queried to determine if it supports Switchover/Switchback (also part of step 1320). If it does, then the operation continues to step 1322; otherwise, the operation is terminated.

In step 1322, the host issues a Modify RNIC verb to the Alternate RNIC and selects the range of QP numbers, the range of CQ numbers, and the range of Memory Translation and Protection Table entries that will be configured for S/S and non-S/S (step 1322). For each CQ that is to be created on the Alternate RNIC, the host issues a Create CQ verb (step 1324). The Create CQ verb specifies the Primary RNIC, the Primary RNIC Port, the Alternate RNIC, and the Alternate RNIC Port associated with the CQ.

For each Memory Region that is to be shared between the Primary RNIC and the Alternate RNIC, the host uses the Register Shared memory verb to register all shared memory regions on the Alternate RNIC (step 1326). Registered through one of the Register Memory Region verbs, the host specifies the Primary RNIC, the Primary RNIC Port, the Alternate RNIC, and the Alternate RNIC Port associated with the Memory Region.

For each QP that is created on the Alternate RNIC, the host issues a Create QP verb (step 1328). The Create QP verb specifies the RNIC State (Alternate), Primary RNIC, the Primary RNIC Port, the Alternate RNIC, and the Alternate RNIC Port associated with the QP. For each Memory Window that is allocated through the Allocate Memory Window verb, the host specifies the Primary RNIC, the Primary RNIC Port, the Alternate RNIC, and the Alternate RNIC Port associated with the Memory Window (step 1330).

For each QP that is to be resynchronized on the Primary RNIC, the host issues a Modify QP verb to Quiesce the QP and assign to the QP: the RNIC State (Primary); the Primary RNIC and port; and Alternate RNIC and port (step 1332). For each CQ that is to be resynchronized on the Primary RNIC, after all QPs assigned to the CQ have been quiesced, the host issues a Modify CQ verb to Quiesce the CQ and assign to the CQ: the RNIC State (Primary); the Primary RNIC and port; and Alternate RNIC and port (step 1334).

For each CQ that is to be resynchronized on the Primary RNIC, the host issues a Modify CQ verb to reactivate the CQ (step 1336). For each QP that needs to be resynchronized on the Primary RNIC, the host issues a Modify QP verb to reactivate the QP (step 1338).

Figure 13C:
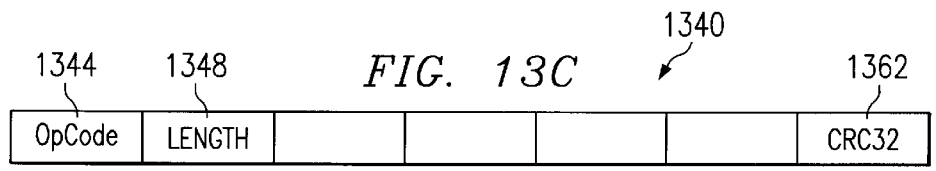
FIG. 13C depicts an exemplary schematic diagram illustrating a checkpoint message used between a Primary and Alternate RNIC in accordance with the present invention.

Referring to FIG. 13C, a schematic diagram is provided that illustrates an exemplary checkpoint message used between the Primary and Alternate RNIC in accordance with the present invention. From FIG. 11, Primary RNIC 1100 and Alternate RNIC 1104 use checkpointing messages 1106 to communicate the RNIC and QP states. The checkpointing messages can be communicated directly through a fabric that interconnects the primary and alternate RNICs. The checkpointing messages can also be communicated indirectly, for example through a shared system memory region that is accessible by both the primary and alternate RNICs.

FIG. 11 shows the exemplary case where the checkpointing messages are sent directly through a fabric that interconnects the primary and the alternate RNICs. The fabric can be a local area network and the messages can be sent over one or more TCP connections. The fabric can also be a Memory Mapped, I/O Expansion Network, such as PCI, PCI-X, or PCI-Express. Finally, the fabric can be a system area network, such as InfiniBand. FIG. 11 shows the exemplary case where the fabric is a Local Area Network.

FIG. 13C shows common fields between all checkpoint messages, such as checkpoint message 1340. The first field of all checkpointing messages is the operation code, such as OpCode 1344, and it describes the type of checkpoint information included in the message. The next field of the message is the length, such as Length 1348, which describes the message length in bytes. The last field of the message is a well-known, iSCSI, 32 bit Cyclical Redundancy Check (CRC32), such as CRC32 1352, and is used to validate the message. Each message defines the fields carried between the Length 1348 and the CRC32 1352. The size of the OpCode and Length fields can be smaller or larger than those depicted. The CRC polynomial used can be different than the one illustrated.

The following table defines the message types used by the checkpoint process and the sections that follow describe the checkpoint process, including the contents of the checkpoint messages. The value of each OpCode and length can be different than shown in the following table without departing from the spirit and scope of the present invention.

| OpCode | Length | Message |
|--------|--------|---------|
| x0000 | x0000 | I am alive |
| x0001 | x0004 | Reserved |
| x0002 | x0004 | Update Working SQ S/S Send Context |
| x0003 | x0004 | Update Committed SQ S/S Send Context |
| x0004 | x0004 | Update Working SQ S/S Ack Context |
| x0005 | x0004 | Update Committed SQ S/S Ack Context |
| x0006 | x0004 | Update Working RQ S/S Receive Context |
| x0007 | x0004 | Update Committed RQ S/S Receive Context |
| x0008 | x0004 | Update Working RQ S/S Ack Context |
| x0009 | x0004 | Update Committed RQ S/S Ack Context |
| x000A | x0004 | Update Working CQ S/S Context |
| x000B | x0004 | Update Committed CQ S/S Context |

Figure 14:
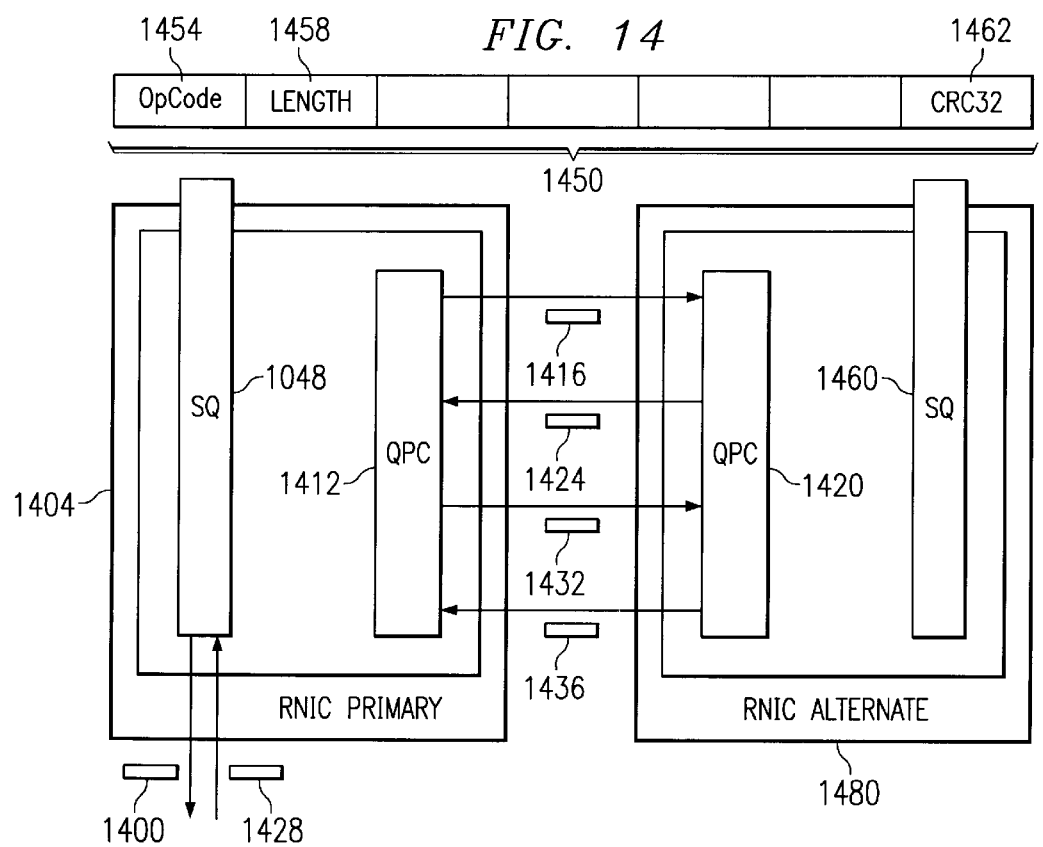
FIG. 14 depicts an exemplary schematic diagram illustrating a Send checkpointing message flow and process used by two RNICs in accordance with the present invention.

Referring to FIG. 14, a schematic diagram illustrating an exemplary Send checkpointing message flow and process used by two RNICs in accordance with the present invention is provided. The RNIC looks up the QP Context associated with an outbound TCP Segment by using QP WQE processing algorithms. The following is the checkpointing message flow used to checkpoint the outbound TCP segment sent from the SQ 1408 of QP Context 1412.

Assume that SQ 1408 has an TCP Segment ready for outbound scheduling. The Primary RNIC 1404 updates the following four fields of its local copy of the Working SQ S/S Context 1224:

---
Working Current Send WQE number
Working Byte offset into current Send WQE
Working Sequence number for next Send TCP segment
Working Window for value for next Send TCP segment

---

After the above four fields have been updated in the local QP Context, the Primary RNIC 1404 sends an Update Working SQ S/S Context Send Message 1416 to the Alternate RNIC 1480. The OpCode 1454 is set to x0002, Update Working SQ S/S Context Send Message 1416. The Length is set to x0004, i.e. the length of the Update Working SQ S/S Context Send Message. The five fields that follow the length are set as follows:

---
QP Number
Working Current Send WQE number
Working Byte offset into current Send WQE
Working Sequence number for next Send TCP segment
Working Window for value for next Send TCP segment

---

The Alternate RNIC 1480 receives the Update Working SQ S/S Context Send Message 1416 and validates it. If the Update Working SQ S/S Context Send Message 1416 is valid, for example the CRC32 1458 is valid, then the Alternate RNIC 1480 updates its local copy of the Working SQ S/S Context with the contents of the Working SQ S/S Context Send Message 1416.

The update of the local copy of the Working SQ S/S Context 1224 on the Alternate RNIC 1480 updates the following four fields of the Working SQ S/S Context 1224:

---
Working Current Send WQE number
Working Byte offset into current Send WQE
Working Sequence number for next Send TCP segment
Working Window for value for next Send TCP segment

---

The Alternate RNIC 1480 then copies its local copy of the Working SQ S/S Context 1224 to its local copy of the Committed SQ S/S Context 1228. The following four fields of the Committed SQ S/S Context 1228 are updated on the Alternate RNIC 1480:

---
Committed Current Send WQE number
Committed Byte offset into current Send WQE
Committed Sequence number for next Send TCP segment
Committed Window for value for next Send TCP segment

---

After the above four fields have been updated in the local QP Context, the Alternate RNIC 1480 sends an Update Committed SQ S/S Context Send Message 1424 to the Primary RNIC 1404. The OpCode 1454 is set to x0003, Update Committed SQ S/S Context Send Message 1424. The Length is set to x0004, i.e. the length of the Update Committed SQ S/S Context Send Message. The five fields that follow the length are set as follows:

---
QP Number
Committed Current Send WQE number
Committed Byte offset into current Send WQE
Committed Sequence number for next Send TCP segment
Committed Window for value for next Send TCP segment

---

The Primary RNIC 1404 receives the Update Committed SQ S/S Context Send Message 1424 and validates it. If the Committed SQ S/S Context Send Message 1424 is valid, for example the CRC32 is valid, then the Primary RNIC 1404 updates its local copy of the Committed SQ S/S Context with the contents of the Committed SQ S/S Context Message 1424. That is, it updates the following four fields of its Committed SQ S/S Context 1228:

---
Committed Current Send WQE number
Committed Byte offset into current Send WQE
Committed Sequence number for next Send TCP segment
Committed Window for value for next Send TCP segment

---

SQ 1408 places the TCP Segment in the outbound scheduler and the scheduler sends 1400 the TCP Segment the next time it sends TCP Segments from SQ 1408.

If the Update Committed SQ S/S Context Send Message 1424 is invalid or if it is not received within a checkpoint timeout window, the Primary RNIC 1404 will resend it up to the number of times defined by the checkpoint retry number. If the Alternate RNIC 1480 receives a duplicate Update Working SQ S/S Context Send Message 1416, it will resend the previous Update Committed SQ S/S Context Send Message 1424. At this point the outbound Send has been checkpointed.

Now, the checkpointing message flow used when a TCP ACK segment is receive by Primary RNIC 1404 and is associated with the SQ 1408 of QP Context 1412 will be described. First, the incoming TCP ACK Segment is received in an intermediate speed matching buffer. If the TCP Ack Segment is not valid, it is discarded. If the TCP Ack Segment is valid, then the Primary RNIC 1404 updates the following four fields of its local copy of the Working SQ S/S Context 1224.

---
Working Current Receive Ack WQE Number
Working Byte offset into Current Receive Ack WQE
Working Sequence num. for next Rcv Ack TCP segment
Working Window value for next Rcv Ack TCP segment

---

After the above four fields have been updated in the local QP Context, the Primary RNIC 1404 sends an Update Working SQ S/S Context Ack Message 1432 to the Alternate RNIC 1480. The OpCode 1454 is set to x0004, i.e. Update Working SQ S/S Context Ack Message 1432. The Length is set to x0004, i.e. the length of the Update Working SQ S/S Context Ack Message. The five fields that follow the length are set as follows:

QP Number
Working Current Receive Ack WQE Number
Working Byte offset into Current Receive Ack WQE
Working Sequence num. for next Rcv Ack TCP segment
Working Window value for next Rcv Ack TCP segment The Alternate RNIC 1480 receives the Update Working SQ S/S Context Ack Message 1432 and validates it. If the Working SQ S/S Context Message 1416 is valid, for example the CRC32 is valid, then the Alternate RNIC 1480 updates its local copy of the Working SQ S/S Context 1224 with the contents of the Working SQ S/S Context Ack Message 1432. The update of the local copy of the Working SQ S/S Context 1224 on the Alternate RNIC 1480 updates the following four fields of the Working SQ S/S Context 1224:

Working Current Receive Ack WQE Number
Working Byte offset into Current Receive Ack WQE
Working Sequence num. for next Rcv Ack TCP segment
Working Window value for next Rcv Ack TCP segment The Alternate RNIC 1480 then copies its local copy of the Working SQ S/S Context 1224 to its local copy of the Committed SQ S/S Context 1228. The following four fields of the Committed SQ S/S Context 1228 are updated on the Alternate RNIC 1480:

Committed Current Receive Ack WQE Number
Committed Byte offset into Current Receive Ack WQE
Committed Sequence num. for next Rcv Ack TCP segment
Committed Window value for next Rcv Ack TCP segment After the above four fields have been updated in the local QP Context, the Alternate RNIC 1480 sends an Update Committed SQ S/S Context Ack Message 1436 to the Primary RNIC 1404. The OpCode 1454 is set to x0005, i.e. Update Committed SQ S/S Context Ack Message 1436. The Length is set to x0004, i.e. the length of the Update Committed SQ S/S Context Ack Message. The five fields that follow the length are set as follows:

QP Number
Committed Current Receive Ack WQE Number
Committed Byte offset into Current Receive Ack WQE
Committed Sequence num. for next Rcv Ack TCP segment
Committed Window value for next Rcv Ack TCP segment The Primary RNIC 1404 receives the Update Committed SQ S/S Context Ack Message 1436 and validates it. If the Committed SQ S/S Context Ack Message 1436 is valid, for example the CRC32 is valid, then the Primary RNIC 1404 updates its local copy of the Committed SQ S/S Context with the contents of the Committed SQ S/S Context Ack Message 1436. That is, it updates the following four fields of its Working SQ S/S Context:

Committed Current Receive Ack WQE Number
Committed Byte offset into Current Receive Ack WQE
Committed Sequence num. for next Rcv Ack TCP segment
Committed Window value for next Rcv Ack TCP segment If the Update Committed SQ S/S Context Ack Message 1436 is invalid, or if it is not received within a checkpoint timeout window, the Primary RNIC 1404 will resend it up to the number of times defined by the checkpoint retry number. If the Alternate RNIC 1480 receives a duplicate Update Working SQ S/S Context Ack Message 1432, it will resend the previous Update Committed SQ S/S Context Ack Message 1436. At this point the incoming Ack has been checkpointed.

Figure 15:
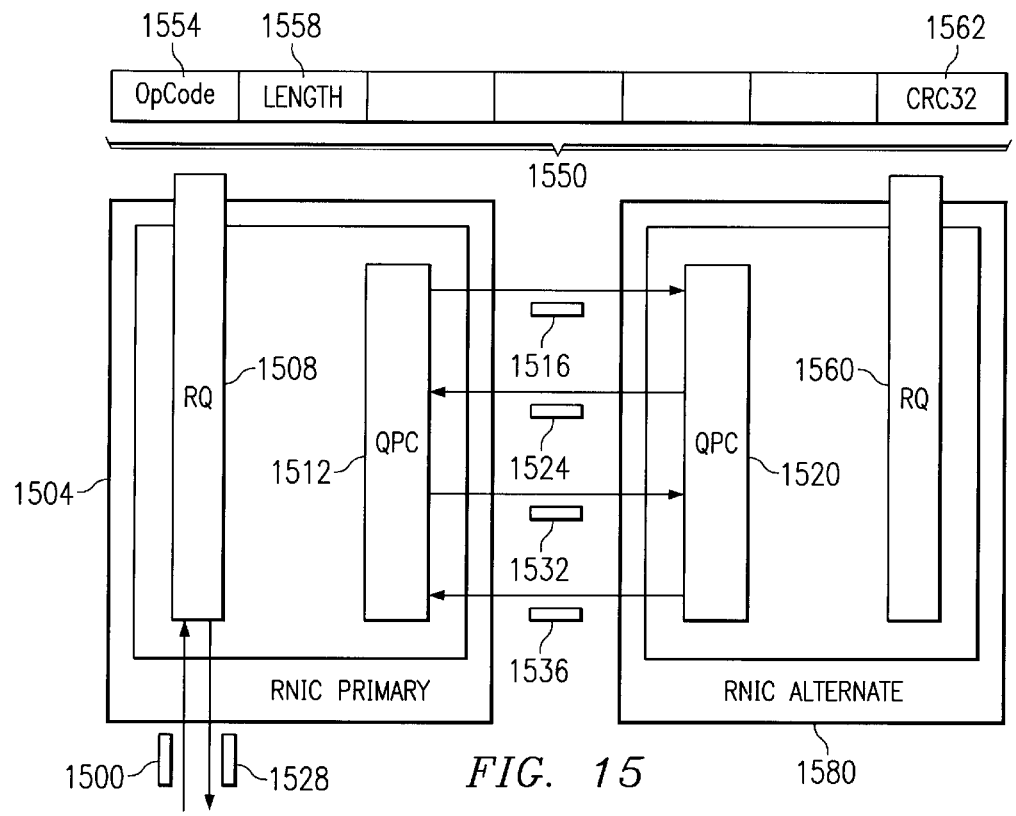
FIG. 15 depicts an exemplary schematic diagram illustrating a Receive checkpointing message flow and process used by two RNICs in accordance with the present invention.

Referring to FIG. 15, a schematic diagram illustrating an exemplary Receive checkpointing message flow and process used by two RNICs in accordance with the present invention is provided. The RNIC looks up the QP Context associated with an incoming TCP Segment by using well known TCP/IP quintuple look-up algorithms. When an incoming TCP Segment is received the TCP/IP quintuple look-up is used to determine the QP associated with the incoming TCP Segment.

The following is an exemplary checkpointing message flow used when the incoming TCP segment targets the RQ 1508 of QP Context 1512. The incoming TCP Segment is received in an intermediate speed matching buffer. If the TCP Segment is valid, it is placed in its final destination; otherwise it is discarded.

After the TCP Segment is placed in its final destination, the Primary RNIC 1504 updates the following four fields of its local copy of the Working RQ S/S Context 1232:

Working Current Receive WQE number
Working Byte offset into current Receive WQE
Working Sequence num. for next receive TCP segment
Working Window value for next Receive TCP segment After the above four fields have been updated in the local QP Context, the Primary RNIC 1504 sends an Update Working RQ S/S Context Receive Message 1516 to the Alternate RNIC 1580. The OpCode 1554 is set to x0006, i.e. Update Working RQ S/S Context Receive Message 1516. The Length is set to x0004, i.e. the length of the Update Working RQ S/S Context Receive Message. The five fields that follow the length are set as follows:

QP Number
Working Current Receive WQE number
Working Byte offset into current Receive WQE
Working Sequence num. for next receive TCP segment
Working Window value for next Receive TCP segment The Alternate RNIC 1580 receives the Update Working RQ S/S Context Receive Message 1516 and validates it. If the Working RQ S/S Context Receive Message 1516 is valid, for example the CRC32 1562 is valid, then the Alternate RNIC 1580 updates its local copy of the Working RQ S/S Context 1232 with the contents of the Working RQ S/S Context Receive Message 1516. The update of the local copy of the Working SQ S/S Context 1232 on the Alternate RNIC 1580 updates the following four fields of the Working SQ S/S Context 1232:

> Working Current Receive WQE number
> Working Byte offset into current Receive WQE
> Working Sequence num. for next receive TCP segment
> Working Window value for next Receive TCP segment The Alternate RNIC 1580 then copies its local copy of the Working RQ S/S Context 1232 to its local copy of the Committed RQ S/S Context 1236. The following four fields of the Committed RQ S/S Context 1236 are updated on the Alternate RNIC 1580:

> Committed Current Receive WQE number
> Committed Byte offset into current Receive WQE
> Committed Sequence num. for next receive TCP segment
> Committed Window value for next Receive TCP segment After the above four fields have been updated in the local QP Context, the Alternate RNIC 1580 sends an Update Committed RQ S/S Context Receive Message 1524 to the Primary RNIC 1504. The OpCode 1554 is set to x0007, i.e. Update Committed RQ S/S Context Receive Message 1524.

The Length is set to x0004, i.e. the length of the Update Committed RQ S/S Context Receive Message. The five fields that follow the length are set as follows:

> QP Number
> Committed Current Receive WQE number
> Committed Byte offset into current Receive WQE
> Committed Sequence num. for next receive TCP segment
> Committed Window value for next Receive TCP segment The Primary RNIC 1504 receives the Update Committed RQ S/S Context Receive Message 1524 and validates it. If the Committed RQ S/S Context Receive Message 1524 is valid, for example the CRC32 is valid, then the Primary RNIC 1504 updates its local copy of the Committed RQ S/S Context 1236 with the contents of the Committed RQ S/S Context Receive Message 1524. That is it updates the following four fields of its Committed RQ S/S Context 1236:

> Committed Current Receive WQE number
> Committed Byte offset into current Receive WQE
> Committed Sequence num. for next receive TCP segment
> Committed Window value for next Receive TCP segment If the Update Committed RQ S/S Context Receive Message 1524 is invalid or if it is not received within a checkpoint timeout window, the Primary RNIC 1504 will resend it up to the number of times defined by the checkpoint retry number. If the Alternate RNIC 1580 receives a duplicate Update Working RQ S/S Context Receive Message 1516, it will resend the previous Update Committed RQ S/S Context Receive Message 1524. At this point the incoming Send has been checkpointed.

The following is an exemplary checkpointing message flow used when a TCP ACK segment is sent from Primary RNIC 1504 and is associated with the RQ 1508 of QP Context 1512. The Primary RNIC 1504 updates the following four fields of its local copy of the Working RQ S/S Context 1232:

> Working Current Send Ack WQE number
> Working Byte offset into current Send Ack WQE
> Working Sequence num. for next Send Ack TCP segment
> Working Window value for next Ack TCP segment After the above four fields have been updated in the local QP Context, the Primary RNIC 1504 sends an Update Working RQ S/S Context Ack Message 1532 to the Alternate RNIC 1580. The OpCode 1554 is set to x0008, i.e. Update Working RQ S/S Context Ack Message 1532. The Length is set to x0004, i.e. the length of the Update Working RQ S/S Context Ack Message. The five fields that follow the length are set as follows:

> QP Number
> Working Current Send Ack WQE number
> Working Byte offset into current Send Ack WQE
> Working Sequence num. for next Send Ack TCP segment
> Working Window value for next Ack TCP segment The Alternate RNIC 1580 receives the Update Working RQ S/S Context Ack Message 1532 and validates it. If the Working RQ S/S Context Ack Message 1532 is valid, for example the CRC32 is valid, then the Alternate RNIC 1580 updates its local copy of the Working RQ S/S Context 1232 with the contents of the Working RQ S/S Context Ack Message 1532. The update of the local copy of the Working RQ S/S Context 1232 on the Alternate RNIC 1580 updates the following four fields of the Working RQ S/S Context 1232:

> Working Current Send Ack WQE number
> Working Byte offset into current Send Ack WQE
> Working Sequence num. for next Send Ack TCP segment
> Working Window value for next Ack TCP segment The Alternate RNIC 1580 then copies its local copy of the Working RQ S/S Context 1232 to its local copy of the Committed RQ S/S Context 1236. The following four fields of the Committed RQ S/S Context 1236 are updated on the Alternate RNIC 1580:

> Committed Current Send Ack WQE number
> Committed Byte offset into current Send Ack WQE
> Committed Sequence num. for next Send Ack TCP segment
> Committed Window value for next Ack TCP segment After the above four fields have been updated in the local QP Context, the Alternate RNIC 1580 sends an Update Committed RQ S/S Context Ack Message 1536 to the Primary RNIC 1504. The OpCode 1454 is set to x0009, i.e. Update Committed RQ S/S Context Ack Message 1536. The Length is set to x0004, i.e. the length of the Update Committed RQ S/S Context Ack Message. The five fields that follow the length are set as follows:

| QP Number |
|---|
| Committed Current Send Ack WQE number |
| Committed Byte offset into current Send Ack WQE |
| Committed Sequence num. for next Send Ack TCP segment |
| Committed Window value for next Ack TCP segment |

The Primary RNIC 1504 receives the Update Committed RQ S/S Context Ack Message 1536 and validates it. If the Committed RQ S/S Context Ack Message 1536 is valid, for example the CRC32 is valid, then the Primary RNIC 1504 updates its local copy of the Committted RQ S/S Context 1236 with the contents of the Committed RQ S/S Context Ack Message 1536. That is, it updates the following four fields of its Working RQ S/S Context:

| Committed Current Send Ack WQE number |
|---|
| Committed Byte offset into current Send Ack WQE |
| Committed Sequence num. for next Send Ack TCP segment |
| Committed Window value for next Ack TCP segment |

If the Update Committed RQ S/S Context Ack Message 1536 is invalid or if it is not received within a checkpoint timeout window, the Primary RNIC 1504 will resend it up to the number of times defined by the checkpoint retry number. If the Alternate RNIC 1580 receives a duplicate Update Working RQ S/S Context Ack Message 1532, it will resend the previous Update Committed RQ S/S Context Ack Message 1536. At this point the outbound Ack has been checkpointed.

Figure 16:
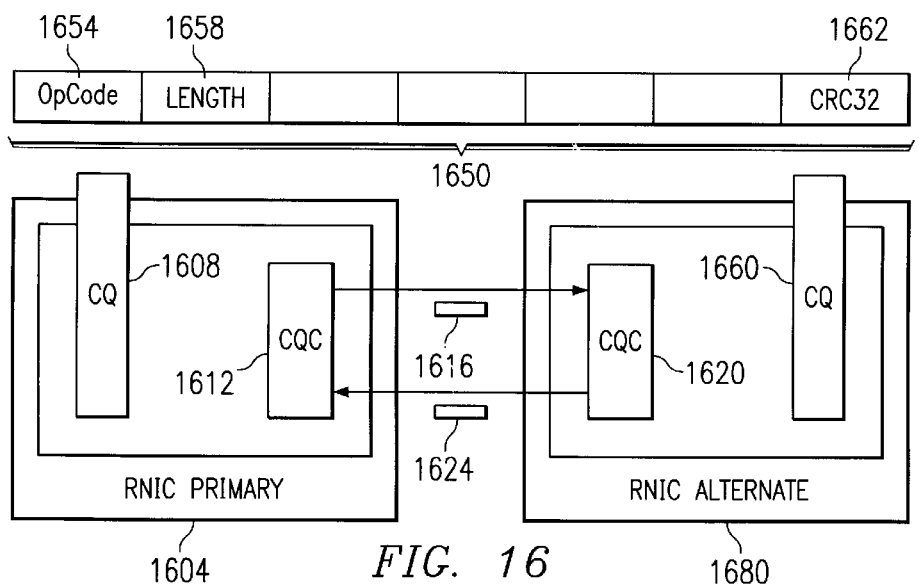
FIG. 16 depicts an exemplary schematic diagram illustrating a Completion checkpointing message flow and process used by two RNICs in accordance with the present invention.

Referring to FIG. 16, a schematic diagram illustrating an exemplary Completion checkpointing work flow and process used by two RNICs in accordance with the present invention is provided. The RNIC looks up the CQ Context associated with a Work Queue Element that has completed by using well known QP WQE processing algorithms and creates a CQE using well known CQ CQE processing algorithms.

The following is the checkpointing message flow used to checkpoint a Completion Queue Element added to CQ 1608 surfaced to the host by RNIC 1604. Assume CQ 1608 has an CQE ready for insertion into CQ 1608. CQ 1608 inserts the CQE into CQ 1608 and updates the following field of its local copy of the Working CQ S/S Context 1272.

| Working Current Completion CQE number |
|---|

After the above field has been updated in the local CQ Context, the Primary RNIC 1604 sends an Update Working CQ S/S Context Message 1616 to the Alternate RNIC 1680. The OpCode 1654 is set to x000A, i.e. Update Working CQ S/S Context Message 1616. The Length is set to x0004, i.e. the length of the Update Working CQ S/S Context Message. The two fields that follow the length are set as follows:

| CQ Number |
|---|
| Working Current Completion CQE number |

The Alternate RNIC 1680 receives the Update Working CQ S/S Context Message 1616 and validates it. If the Update Working CQ S/S Context Message 1616 is valid, for example the CRC32 1662 is valid, then the Alternate RNIC 1680 updates its local copy of the Working CQ S/S Context 1272 with the contents of the Working CQ S/S Context Message 1516. The update of the local copy of the Working CQ S/S Context 1272 on the Alternate RNIC 1680 updates the following field of the Working CQ S/S Context 1272:

| Working Current Completion CQE number |
|---|

The Alternate RNIC 1680 then copies its local copy of the Working CQ S/S Context 1624 to its local copy of the Committed CQ S/S Context 1276. The following field of the Committed CQ S/S Context 1276 is updated on the Alternate RNIC 1680:

| Committed Current Completion CQE number |
|---|

After the above field has been updated in the local QP Context, the Alternate RNIC 1680 sends an Update Committed CQ S/S Context Message 1624 to the Primary RNIC 1604. The OpCode 1654 is set to x000B, i.e. Update Committed CQ S/S Context Message 1624. The Length is set to x0004, i.e. the length of the Update Committed CQ S/S Context Message. The two fields that follow the length are set as follows:

| CQ Number |
|---|
| Committed Current Completion CQE number |

The Primary RNIC 1604 receives the Update Committed CQ S/S Context Message 1624 and validates it. If the Committed CQ S/S Context Message 1624 is valid, for example the CRC32 is valid, then the Primary RNIC 1604 updates its local copy of the Committted CQ S/S Context 1276 with the contents of the Committed CQ S/S Context Message 1624. That is, it updates the following field of its Committed CQ S/S Context 1276:

| Committed Current Completion CQE number |
|---|

If the Update Committed CQ S/S Context Message 1624 is invalid or if it is not received within a checkpoint timeout window, the Primary RNIC 1604 will resend it up to the number of times defined by the checkpoint retry number. If the Alternate RNIC 1680 receives a duplicate Update Working CQ S/S Context Message 1616, it will resend the previous Update Committed CQ S/S Context Message 1624. At this point the CQE has been checkpointed.

Figure 17:
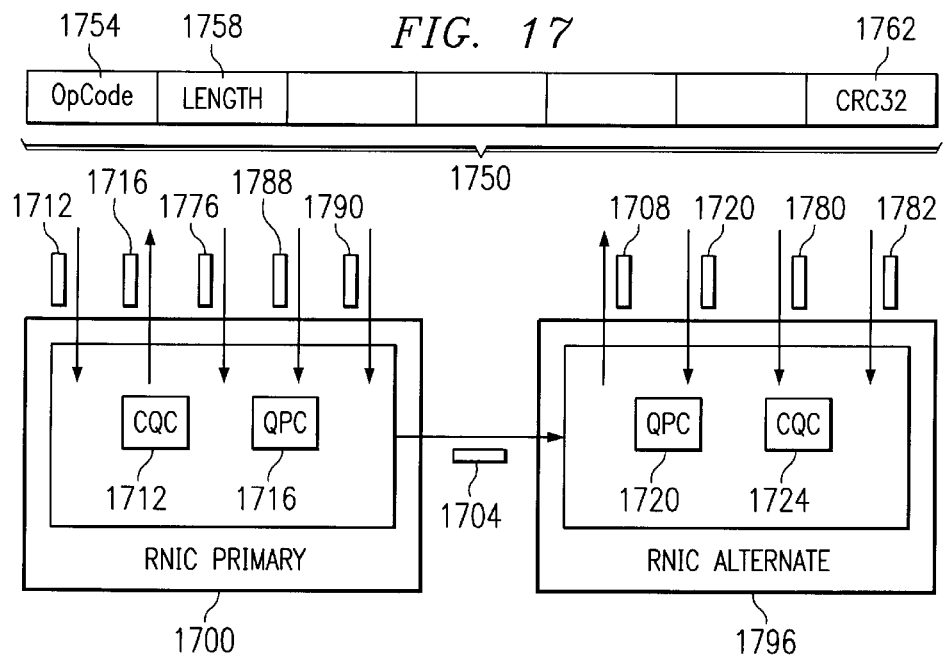
FIG. 17 depicts an exemplary schematic diagram illustrating a Primary RNIC to Alternate RNIC switchover message flow and process used by two RNICs in accordance with the present invention.

Referring to FIG. 17, a schematic diagram illustrating the Primary RNIC to Alternate RNIC switchover message flow and process used by two RNICs in accordance with the present invention. The primary RNIC, such as Primary RNIC 1700, and the alternate RNIC, such as Alternate RNIC 1796, issue an "I Am Alive" checkpoint message, such an "I Am Alive" checkpoint messages 1704 and 1772, every N time periods, where N is a programmable RNIC attribute that can be queried through the Query RNIC verb and modified through the Modify RNIC verb.

The following is an exemplary switchover message flow used to switchover from the Primary RNIC 1700 to the Alternate RNIC 1796. First, the Alternate RNIC 1796 sets the "I Am Alive" count down timer. If the Alternate RNIC 1796 receives an "I Am Alive" message 1704 before the "I Am Alive" count down timer has expired, the timer is reset. The "I Am Alive" message has the OpCode 1754 set to x0000, i.e. "I Am Alive" Message 1704 and 1750. The Length is set to x0003, i.e. the length of the "I Am Alive" Message. The three fields that follow the length are set as follows:

| RNIC Identifier |
| --- |
| RNIC Port Number |
| RNIC Port Number State |

For multiported RNICs, the "I Am Alive" Message can be implemented to carry a variable number of fields after the length field, such as the following (where N is the maximum number of ports supported by the RNIC):

| RNIC Identifier |
| --- |
| Number of RNIC Ports |
| RNIC Port Number 1 |
| RNIC Port Number State 1 |
| RNIC Port Number 2 |
| RNIC Port Number State 2 |
| RNIC Port Number N |
| RNIC Port Number State N |

If the Alternate RNIC 1796 does not receive an "I Am Alive" message 1704 before the "I Am Alive" count down timer expires, then it initiates a switchover by sending a Switchover Request Asynchronous Event 1708 to the host.

The host receives the Switchover Request Asynchronous Event 1708 and attempts to access Primary RNIC 1700 through a Query RNIC 1712. The Primary RNIC 1700 returns the Query RNIC results 1716.

If the Query RNIC 1712 succeeds, and the Query RNIC results 1716 reflect that the Primary RNIC 1700 is fully functional and in a non-error state, then the host will:

A) request, through switch management protocol, that Alternate RNIC 1796 be made inaccessible to the switch it is connected to;

B) Add the LAN Address (e.g. Ethernet MAC Address) of Alternate RNIC 1796 to the Primary RNIC 1700 LAN Address table, by issuing a Modify RNIC 1776 verb;

C) request, through network address change protocol (e.g. a gratuitous ARP reply), that the additional LAN address (i.e. the address previously used by Alternate RNIC 1796) be recognized as one of the addresses for Primary RNIC 1700;

D) Use Modify CQ 1790 on Primary RNIC 1700 to change the state of CQC 1712;

E) The Primary RNIC 1700 places the CQC 1712 in the Primary State by changing the RNIC State in the CQC 1712 Primary and Alternate RNIC Identification Context from Alternate State to the Primary State;

F) Use Modify QP 1788 on Primary RNIC 1700 to change the state of QPC 1716; and G) The Primary RNIC 1700 places the QPC 1716 in the Primary RTS State by changing the RNIC State in the QPC 1716 Primary and Alternate RNIC Identification Context from Alternate RTS State to the Primary RTS State. Steps D and E are performed for all CQs that had been set up with the primary RNIC as Primary RNIC 1700 and the alternate RNIC as Alternate RNIC 1796. An optimization can be performed for the Modify CQs 1790 that involves the Modify CQs 1790 being issued as a Modify CQ Set verb that modifies a list of CQs rather than as individual Modify CQ verbs.

Steps F and G are performed for all QPs that had been set up with the primary RNIC as Primary RNIC 1700 and the alternate RNIC as Alternate RNIC 1796. An optimization can be performed for the Modify QPs 1788 that involves issuing a Modify QP Set verb that modifies a list of Qps rather than sending a plurality of individual Modify QP verbs.

If the Query RNIC 1712 fails (e.g. the Primary RNIC 1700 fails to return the Query RNIC results 1716), or if the Query RNIC 1712 succeeds but the Query RNIC results 1716 are erroneous or reflect that the Primary RNIC 1700 is in an error state, then the host will:

A) Add the LAN Address (e.g. Ethernet MAC Address) of Primary RNIC 1700 to the Alternate RNIC 1796 LAN Address table, by issuing a Modify RNIC 1720;

B) request, through well-known switch management protocol, that Primary RNIC 1700 be made inaccessible to the switch it is connected to;

C) request, through well-known network address change protocol (e.g. a gratuitous ARP reply), that the additional LAN address (i.e. the address previously used be Primary RNIC 1700) be recognized as one of the addresses for Alternate RNIC 1796;

D) Use Modify CQ 1782 on Alternate RNIC 1796 to change the state of CQC 1724;

E) The Alternate RNIC 1796 places the CQC 1824 in the Primary State by changing the RNIC State in the CQC 1724 Primary and Alternate RNIC Identification Context from Alternate State to the Primary State;

F) Use Modify QP 1780 on Alternate RNIC 1796 to change the state of QPC 1720; and G) The Alternate RNIC 1796 places the QPC 1720 in the Primary RTS State by changing the RNIC State in the QPC 1720 Primary and Alternate RNIC Identification Context from Alternate RTS State to the Primary RTS State.

Steps D and E are performed for all CQs that had been set up with the primary RNIC as Primary RNIC 1700 and the alternate RNIC as Alternate RNIC 1796. An optimization can be performed for the Modify CQs 1782 that involves issuing a Modify CQ Set verb that modifies a list of CQs rather than a plurality of individual Modify CQ verbs.

Steps F and G are performed for all QPs that had been set up with the primary RNIC as Primary RNIC 1700 and the alternate RNIC as Alternate RNIC 1796. An optimization can be performed for the Modify QPs 1780 that involves issuing a Modify QP Set verb that modifies a list of Qps rather than issuing individual Modify QP verbs.

Figure 18:
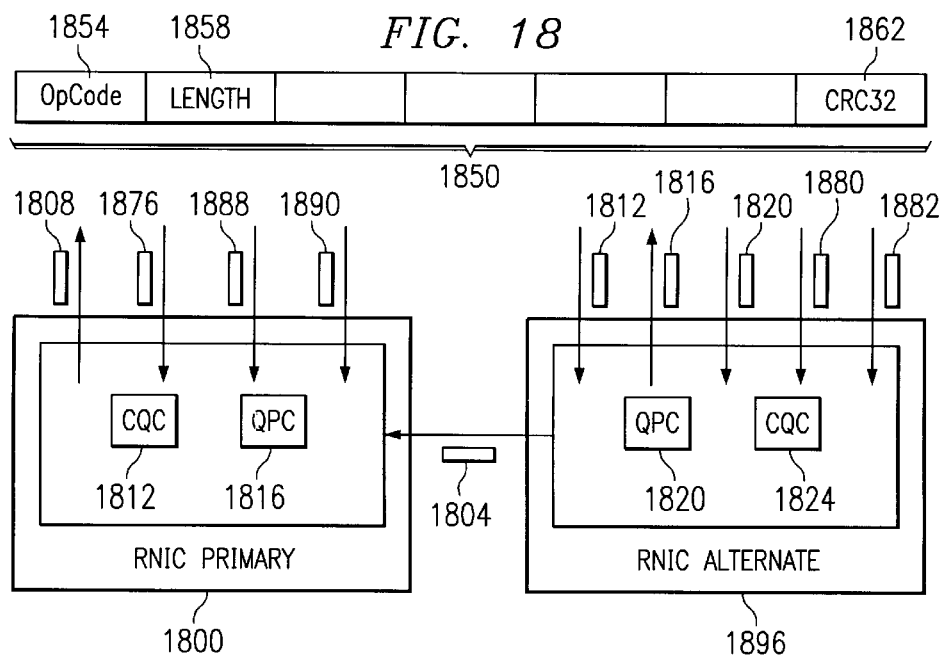
FIG. 18 depicts an exemplary schematic diagram illustrating an Alternate QP Activation message flow and process used by two RNICs in accordance with the present invention.

Referring know to FIG. 18, a schematic diagram is provided illustrating an exemplary Alternate RNIC Disablement message flow and process used by two RNICs in accordance with the present invention. Initially in FIG. 18, QPC 1816 is the Primary QPC and QPC 1820 is its Alternate QPC. Initially in FIG. 18, CQC 1812 is the Primary CQC and CQC 1824 is its Alternate CQC.

The following is an exemplary Alternate RNIC Disablement message flow used to disable an Alternate RNIC 1896 that is not fully operational. First, the Primary RNIC 1800 sets the "I Am Alive" count down timer. If the Primary RNIC 1700 receives an "I Am Alive" message 1804 before the "I Am Alive" count down timer has expired, the timer is reset. The "I Am Alive" message has the OpCode 1854 set to x0000, i.e. "I Am Alive"Message 1804 and 1850. The Length is set to x0003, the i.e. the length of the "I Am Alive" Message. The three fields that follow the length are set as follows:

| RNIC Identifier |
| RNIC Port Number |
| RNIC Port Number State |

For multiported RNICs, the "I Am Alive" Message can be implemented to carry a variable number of fields after the length field, such as the following (where N is the maximum number of ports supported by the RNIC):

| RNIC Identifier |
| Number of RNIC Ports |
| RNIC Port Number 1 |
| RNIC Port Number State 1 |
| RNIC Port Number 2 |
| RNIC Port Number State 2 |
| RNIC Port Number N |
| RNIC Port Number State N |

If the Primary RNIC 1800 does not receive an "I Am Alive" message 1804 before the "I Am Alive" count down timer expires, then it initiates a disablement of the Alternate RNIC by sending a Disable Alternate RNIC Asynchronous Event 1808 to the host. The host receives the Disable Alternate RNIC Asynchronous Event 1808 and attempts to access Alternate RNIC 1896 through a Query RNIC 1812. Alternate RNIC 1896 returns the Query RNIC results 1816.

If the Query RNIC 1812 succeeds, and the Query RNIC results 1816 reflect that the Alternate RNIC 1896 is fully functional and in a non-error state, then the host will:

A) Add the LAN Address (e.g. Ethernet MAC Address) of Primary RNIC 1800 to the Alternate RNIC 1896 LAN Address table, by issuing a Modify RNIC 1820;

B) request, through well-known switch management protocol, that Primary RNIC 1800 be made inaccessible to the switch it is connected to;

C) request, through well-known network address change protocol (e.g. a gratuitous ARP reply), that the additional LAN address (i.e. the address previously used by Primary RNIC 1800) be recognized as one of the addresses for Alternate RNIC 1896;

D) Use Modify CQ 1882 on Alternate RNIC 1896 to change the state of CQC 1824;

E) The Alternate RNIC 1896 places the CQC 1824 in the Primary State by changing the RNIC State in the CQC 1824 Primary and Alternate RNIC Identification Context from Alternate State to the Primary State;

F) Use Modify QP 1880 on Alternate RNIC 1896 to change the state of QPC 1820; and G) The Alternate RNIC 1896 places the QPC 1820 in the Primary RTS State by changing the RNIC State in the QPC 1820 Primary and Alternate RNIC Identification Context from Alternate RTS State to the Primary RTS State. Steps D and E are performed for all CQs that had been set up with the primary RNIC as Primary RNIC 1800 and the alternate RNIC as Alternate RNIC 1896.

An optimization can be performed for the Modify CQs 1882 involving the issuing of a Modify CQ Set verb that modifies a list of CQs rather than issuing a plurality of individual Modify CQ verbs.

Steps F and G are performed for all QPs that had been set up with the primary RNIC as Primary RNIC 1800 and the alternate RNIC as Alternate RNIC 1896. An optimization can be performed for the Modify QPs 1880 involves issuing a Modify QP Set verb that modifies a list of QPs rather than issuing a plurality of individual Modify QP verbs.

If the Query RNIC 1812 fails (e.g. the Alternate RNIC 1896 fails to return the Query RNIC results 1816), or if the Query RNIC 1812 succeeds, but the Query RNIC results 1816 are erroneous or reflect that the Alternate RNIC 1896 is in an error state, then the host will:

A) request, through well-known switch management protocol, that Alternate RNIC 1896 be made inaccessible to the switch it is connected to;

B) Add the LAN Address (e.g. Ethernet MAC Address) of Alternate RNIC 1896 to the Primary RNIC 1800 LAN Address table, by issuing a Modify RNIC 1876;

C) request, through well-known network address change protocol (e.g. a gratuitous ARP reply), that the additional LAN address (i.e. the address previously used by Alternate RNIC 1896) be recognized as one of the addresses for Primary RNIC 1800;

D) Use Modify CQ 1890 on Primary RNIC 1800 to change the state of CQC 1812;

E) The Primary RNIC 1800 places the CQC 1812 in the Primary State by changing the RNIC State in the CQC 1812 Primary and Alternate RNIC Identification Context from Alternate State to the Primary State;

F) Use Modify QP 1888 on Primary RNIC 1800 to change the state of QPC 1816; and G) The Primary RNIC 1800 places the QPC 1816 in the Primary RTS State by changing the RNIC State in the QPC 1816 Primary and Alternate RNIC Identification Context from Alternate RTS State to the Primary RTS State.

Steps D and E are performed for all CQs that had been set up with the primary RNIC as Primary RNIC 1800 and the alternate RNIC as Alternate RNIC 1896. An optimization can be performed for the Modify CQs 1890 that involves issuing a Modify CQ Set verb that modifies a list of CQs rather than issuing a plurality of individual Modify CQ verbs.

Steps F and G are performed for all QPs that had been set up with the primary RNIC as Primary RNIC 1800 and the alternate RNIC as Alternate RNIC 1896. An optimization can be performed for the Modify QPs 1888 that involves issuing a Modify QP Set verb that modifies a list of QPs rather than a plurality of individual Modify QP verbs.

Thus, with the present invention, RNIC switchover and switchback support is provided. Using the mechanism provided in the present invention when a planned or unplanned outage occurs on a primary RNIC, all outstanding connections are switched over to an alternate RNIC, and the alternate RNIC continues communication processing.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiments described above were chosen and described in order to best explain the principles of the invention, the practical application, and to enable others of ordinary skill in the art to understand the invention for various embodiments with various modifications as are suited to the particular use contemplated.

What is claimed is:

1. A method for performing switchover between a primary Remote Direct Memory Access enabled Network Interface Controller (RNIC) and an alternate RNIC in a data processing system, comprising:

creating a common queue pair for the primary RNIC and the alternate RNIC such that the primary RNIC and alternate RNIC share the common queue pair;

detecting a switchover event; and responsive to a detection of a switchover event, switching over handling of the queue pair from the primary RNIC to the alternate RNIC.

2. The method of claim 1, wherein the primary RNIC and the alternate RNIC send checkpointing messages to each other via one of a fabric and a shared system memory.

3. The method of claim 2, wherein the checkpointing messages include an operation code field, a length field, and a validation field.

4. The method of claim 3, wherein the operation code identifies the type of checkpointing message as one of a alive message, update working send queue switchover send context, update committed send queue switchover send context, update working send queue switchover acknowledgment context, update committed send queue switchover acknowledgment context, update working receive queue switchover receive context, update committed receive queue switchover receive context, update working receive queue switchover acknowledgment context, update committed receive queue switchover acknowledgment context, update working completion queue switchover context, and update committed completion queue switchover context.

5. The method of claim 2, wherein the fabric is one of a local area network, a wide area network, a memory mapped I/O expansion network, and a system area network.

6. The method of claim 1, wherein creating a common queue pair includes assigning a queue range to the primary RNIC and the alternate RNIC such that the primary RNIC and alternate RNIC share queues within the queue range.

7. The method of claim 6, wherein the queue range includes a range of queue pairs and a range of completion queues.

8. The method of claim 1, further comprising maintaining state information within the primary RNIC and alternate RNIC, the state information identifying a switchover state of the queues.

9. The method of claim 8, wherein maintaining the state information includes maintaining a primary and alternate RNIC identification context data structure that includes at least one of a a RNIC switchover state, a primary RNIC identifier, a primary RNIC port identifier, an alternate RNIC identifier, and an alternate RNIC port identifier.

10. The method of claim 8, wherein maintaining the state information includes maintaining a completion queue context table having entries for each common completion queue of the primary RNIC and alternate RNIC.

11. The method of claim 1, wherein creating a common queue pair includes assigning a range of memory translation protection table entries to the primary RNIC and alternate RNIC.

12. The method of claim 1, further comprising:

creating a common completion queue for the primary RNIC and the alternate RNIC such that the primary RNIC and alternate RNIC share the common completion queue; and switching over operation of the common completion queue to the alternate RNIC if a switchover event is detected.

13. The method of claim 1, wherein the switchover event is non-receipt, in the alternate RNIC, of a checkpoint message from the primary RNIC within a predetermined period of time.

14. The method of claim 1, wherein switching over handling of the queue pair from the primary RNIC to the alternate RNIC includes:

adding an address for the primary RNIC to an address table of the alternate RNIC;

making the primary RNIC inaccessible to a switch coupled to the primary RNIC and the alternate RNIC; and making the address of the primary RNIC recognizable as an address for the alternate RNIC in the switch.

15. The method of claim 1, wherein switching over handling of the queue pair from the primary RNIC to the alternate RNIC includes:

modifying primary and alternate RNIC identification context information for a completion queue context so that the alternate RNIC is recognized as the primary RNIC; and modifying primary and alternate RNIC identification context information for a queue pair context so that the alternate RNIC is recognized as the primary RNIC.

16. A computer program product in a computer readable medium for performing switchover between a primary Remote Direct Memory Access enabled Network Interface Controller (RNIC) and an alternate RNIC in a data processing system, comprising:

first instructions for creating a common queue pair for the primary RNIC and the alternate RNIC such that the primary RNIC and alternate RNIC share the common queue pair;

second instructions for detecting a switchover event; and third instructions for switching over handling of the queue pair from the primary RNIC to the alternate RNIC if a switchover event is detected.

17. The computer program product of claim 16, wherein the first instructions for creating a common queue pair include instructions for assigning a queue range to the primary RNIC and the alternate RNIC such that the primary RNIC and alternate RNIC share queues within the queue range.

18. The computer program product of claim 16, further comprising:

fourth instructions for creating a common completion queue for the primary RNIC and the alternate RNIC such that the primary RNIC and alternate RNIC share the common completion queue; and fifth instructions for switching over operation of the common completion queue to the alternate RNIC if a switchover event is detected.

19. The computer program product of claim 16, wherein the switchover event is non-receipt, in the alternate RNIC, of a checkpoint message from the primary RNIC within a predetermined period of time.

20. The computer program product of claim 16, wherein the third instructions for switching over handling of the queue pair from the primary RNIC to the alternate RNIC include:

instructions for adding an address for the primary RNIC to an address table of the alternate RNIC;

instructions for making the primary RNIC inaccessible to a switch coupled to the primary RNIC and the alternate RNIC; and instructions for making the address of the primary RNIC recognizable as an address for the alternate RNIC in the switch.

21. The computer program product of claim 16, wherein the third instructions for switching over handling of the queue pair from the primary RINIC to the alternate RNIC include:

instructions for modifying primary and alternate RNIC identification context information for a completion queue context so that the alternate RNIC is recognized as the primary RNIC; and instructions for modifying primary and alternate RNIC identification context information for a queue pair context so that the alternate RNIC is recognized as the primary RNIC.

22. The computer program product of claim 16, further comprising fourth instructions for maintaining state information within the primary RNIC and alternate RNIC, the state information identifying a switchover state of the queues.

23. A method of sending data segments in a data processing system having a primary RNIC and an alternate RNIC, comprising:

receiving a data segment;

updating working send queue switchover context information in the primary RNIC;

sending an update working send queue switchover context checkpointing message to the alternate RNIC;

receiving an update committed send queue switchover context checkpointing message from the alternate RNIC;

updating a local copy of a committed send queue switchover context with contents of the update committed send queue switchover context checkpointing message; and sending the data segment from a send queue.

24. The method of claim 23, wherein the alternate RNIC updates a local working send queue switchover context with contents of the update working send queue switchover context checkpointing message; and copies the working send queue switchover context to a committed send queue switchover context.

25. A computer program product in a computer readable medium for sending data segments in a data processing system having a primary RNIC and an alternate RNIC, comprising:

first instructions for receiving a data segment;

second instructions for updating working send queue switchover context information in the primary RNIC;

third instructions for sending an update working send queue switchover context checkpointing message to the alternate RNIC;

fourth instructions for receiving an update committed send queue switchover context checkpointing message from the alternate RNIC;

fifth instructions for updating a local copy of a committed send queue switchover context with contents of the update committed send queue switchover context checkpointing message; and sixth instructions for sending the data segment from a send queue.

26. An apparatus for performing switchover between a primary Remote Direct Memory Access enabled Network Interface Controller (RNIC) and an alternate RNIC in a data processing system, comprising:

means for creating a common queue pair for the primary RNIC and the alternate RNIC such that the primary RNIC and alternate RNIC share the common queue pair;

means for detecting a switchover event; and means for switching over handling of the queue pair from the primary RNIC to the alternate RNIC if a switchover event is detected.

27. An apparatus for sending data segments in a data processing system having a primary RNIC and an alternate RNIC, comprising:

means for receiving a data segment;

means for updating working send queue switchover context information in the primary RNIC;

means for sending an update working send queue switchover context checkpointing message to the alternate RNIC;

means for receiving an update committed send queue switchover context checkpointing message from the alternate RNIC;

means for updating a local copy of a committed send queue switchover context with contents of the update committed send queue switchover context checkpointing message; and means for sending the data segment from a send queue.

* * * * *